US012440604B2

(12) United States Patent
Taboas et al.

(10) Patent No.: US 12,440,604 B2
(45) Date of Patent: Oct. 14, 2025

(54) BONE REGENERATION IN COMPROMISED WOUNDS

(71) Applicant: University of Pittsburgh—Of the Commonwealth System of Higher Education, Pittsburgh, PA (US)

(72) Inventors: Juan M. Taboas, Pittsburgh, PA (US); Alejandro Jose Almarza, Pittsburgh, PA (US); Jingming Chen, Chicago, IL (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 1022 days.

(21) Appl. No.: 17/055,046

(22) PCT Filed: Jun. 13, 2019

(86) PCT No.: PCT/US2019/037081
§ 371 (c)(1),
(2) Date: Nov. 12, 2020

(87) PCT Pub. No.: WO2019/241577
PCT Pub. Date: Dec. 19, 2019

(65) Prior Publication Data
US 2021/0213170 A1 Jul. 15, 2021

Related U.S. Application Data

(60) Provisional application No. 62/684,401, filed on Jun. 13, 2018.

(51) Int. Cl.
A61L 27/38 (2006.01)
A61L 27/26 (2006.01)
A61L 27/52 (2006.01)
A61L 27/54 (2006.01)
A61M 5/19 (2006.01)

(52) U.S. Cl.
CPC .......... *A61L 27/3847* (2013.01); *A61L 27/26* (2013.01); *A61L 27/3834* (2013.01); *A61L 27/52* (2013.01); *A61L 27/54* (2013.01); *A61M 5/19* (2013.01); *A61L 2300/236* (2013.01); *A61L 2300/252* (2013.01); *A61L 2300/414* (2013.01); *A61L 2300/426* (2013.01); *A61L 2400/06* (2013.01); *A61L 2430/02* (2013.01)

(58) Field of Classification Search
CPC ......... A61L 2300/236; A61L 2300/252; A61L 27/54; A61L 2300/426
See application file for complete search history.

(56) References Cited

U.S. PATENT DOCUMENTS

| | | | |
|---|---|---|---|
| 6,632,457 B1 | 10/2003 | Sawhney | |
| 7,574,261 B2 | 8/2009 | Dodge et al. | |
| 7,680,542 B2 | 3/2010 | Widmann | |
| 8,268,344 B2 | 9/2012 | Ma et al. | |
| 8,337,873 B2 | 12/2012 | Mao | |
| 8,920,791 B2 | 12/2014 | Nakashima et al. | |
| 9,040,070 B2 | 5/2015 | Okamoto et al. | |
| 9,180,072 B2 | 11/2015 | Shah et al. | |
| 9,180,166 B2 | 11/2015 | Arinzeh et al. | |
| 9,228,027 B2 | 1/2016 | Gurtner et al. | |
| 9,327,015 B2 | 5/2016 | Serhan et al. | |
| 9,724,368 B2 | 8/2017 | Nakashima et al. | |
| 2007/0286880 A1 | 12/2007 | Vasiliev et al. | |
| 2009/0148486 A1 | 6/2009 | Lu et al. | |
| 2011/0172150 A1 | 7/2011 | Bader | |
| 2011/0177134 A1 | 7/2011 | Harmon et al. | |
| 2011/0274742 A1 | 11/2011 | Arinzeh et al. | |
| 2012/0209319 A1* | 8/2012 | Bianco-Peled | ....... A61L 24/001 606/213 |
| 2012/0214217 A1 | 8/2012 | Grogan et al. | |

(Continued)

FOREIGN PATENT DOCUMENTS

CN 104548212 4/2015
EP 2268254 1/2011

(Continued)

OTHER PUBLICATIONS

CN 104307049 (machine translation), Apr. 13, 2016, pp. 1-11 (Year: 2016).*
Hinz, Borris, Matrix Biol. (2015), 47, 54-65 (Year: 2015).*
Moxham, J. Paul, et al., The Journal of Otolaryngology, vol. 25, No. 6, 1996 pp. 388-392 (Year: 1996).*
Beck, L. Steven, Journal of Bone and Mineral Research, vol. 6, No. 11, 1991, pp. 1257-1265 (Year: 1991).*
Chen, et al., "Hydrogel to guide chondrogenesis versus osteogenesis of mesenchymal stem cells for fabrication of cartilaginous tissues," *Biomed. Mater.*, 15:4, Sections 2.2, 2.4, 5, p. 9 (right column), May 8, 2020 (10 pages).

(Continued)

*Primary Examiner* — Brian-Yong S Kwon
*Assistant Examiner* — Lyndsey M Beckhardt
(74) *Attorney, Agent, or Firm* — Klarquist Sparkman, LLP

(57) ABSTRACT

Biomaterials disclosed herein can comprise a hydrogel comprising PEG, gelatin, and a glycosaminoglycan with sulfated moiety; and chondrogenic, osteogenic, and immunomodulatory cytokines; wherein the biomaterial is capable of potentiating bone regeneration in a compromised wound while reducing inflammatory response. The glycosaminoglycan with sulfated moiety can comprise heparin, heparan sulfate, keratin sulfate, chondroitin sulfate, dermatan sulfate, and/or similar materials. The biomaterial can further comprise mesenchymal stem cells (MSCs), a crosslinking initiator, microparticles and nanoparticles, and or other materials. The biomaterial can be injectable into a wound, or the biomaterial can be loaded in, or further comprise a porous scaffold providing mechanical support for other components of the biomaterial, such that it can be implanted into a wound.

11 Claims, 24 Drawing Sheets

(56) References Cited

U.S. PATENT DOCUMENTS

| | | | |
|---|---|---|---|
| 2013/0052155 A1 | 2/2013 | Marcolongo et al. | |
| 2014/0112973 A1 | 4/2014 | Steinberg et al. | |
| 2014/0256843 A1 | 9/2014 | Sender et al. | |
| 2014/0302111 A1 | 10/2014 | Mao et al. | |
| 2014/0315805 A1* | 10/2014 | Carmichael | A61P 7/06 514/423 |
| 2016/0095958 A1 | 4/2016 | Grayson et al. | |
| 2016/0296664 A1 | 10/2016 | Lu et al. | |
| 2017/0203009 A1 | 7/2017 | Yang et al. | |
| 2019/0048151 A1 | 2/2019 | Wang et al. | |
| 2020/0205983 A1 | 7/2020 | Vargas Diaz et al. | |
| 2020/0306143 A1 | 10/2020 | Yelick et al. | |
| 2021/0213170 A1 | 7/2021 | Taboas et al. | |
| 2021/0283311 A1 | 9/2021 | Bertassoni et al. | |

FOREIGN PATENT DOCUMENTS

| | | |
|---|---|---|
| EP | 2460529 | 6/2012 |
| JP | 2005-211477 A | 8/2005 |
| JP | 2005-213449 A | 8/2005 |
| JP | 5748194 B2 | 7/2015 |
| WO | WO 2009/078971 A1 | 6/2009 |
| WO | WO 2010/148229 A1 | 12/2010 |
| WO | WO 2012/069870 A1 | 5/2012 |
| WO | WO 2011/048803 A1 | 3/2013 |
| WO | WO 2013/171736 | 11/2013 |
| WO | WO 2014/169236 | 10/2014 |
| WO | WO 2015/168292 A1 | 11/2015 |
| WO | WO 2016/011039 A1 | 1/2016 |
| WO | WO2017/152112 A2 | 9/2017 |
| WO | WO2019/094389 A1 | 5/2019 |
| WO | WO2019/183201 A1 | 9/2019 |
| WO | WO2019/241577 A1 | 12/2019 |

OTHER PUBLICATIONS

Chrepa et al., "Evaluation of a Commercially Available Hyaluronic Acid Hydrogel (Restylane) as Injectable Scaffold for Dental Pulp Regeneration: An In Vitro Evaluation," *Journal of Endodontics*, 43.2: 257-262, Feb. 2017.

Diogenes et al., "Regenerative Endodontic Procedures: Clinical Outcomes," *Dental Clinics of North America*, 61.1: 111-125, Jan. 2017.

Ehrmann et al., "The relationship of intracanal medicaments to postoperative pain in endodontics," *International Endodontic Journal* 36: 868-875, 2003.

Extended Search Report for related European Application No. 19771745.7, mailed Nov. 19, 2021 (9 pages).

Fayazi et al., "Comparative Evaluation of Chemotactic Factor Effect on Migration and Differentiation of Stem Cells of the Apical Papilla," *Journal of Endodontics*, 43.8: 1288-1293, Aug. 2017.

Galler et al., "Cell-free Approaches for Dental Pulp Tissue Engineering," *Journal of Endodontics*, 40.4: S41-S45, Apr. 2014.

International Search Report and Written Opinion for related International Application No. PCT/US2019/023132, mailed by the Israeli Searching Authority on Jun. 27, 2019 (11 pages).

International Search Report and Written Opinion for International Application No. PCT/US2021/051096, mailed by the Israeli Searching Authority on Dec. 15, 2021 (11 pages).

Iohara et al., "Complete Pulp Regeneration After Pulpectomy by Transplantation of CD105+ Stem Cells with Stromal Cell-Derived Factor-1," *Tissue Engineering: Part A*, 17.15-16: 1911-1920, Mar. 2011.

Ishimatsu et al., "Formation of dentinal bridge on surface of regenerated dental pulp in dentin defects by controlled release of fibroblast growth factor=2 from gelatin hydrogels," *J. Endod.* 35.6: 858-865, Jun. 2009.

Kim et al., "Regeneration of dental-pulp-like tissue by chemotaxis-induced cell homing," *Tissue Engineering* Part A, 16.10: 3023-3031, Nov. 10, 2010.

Li et al., "Pulp regeneration in a full-length human tooth root using a hierarchical nanofibrous microsphere system," *Acta Biomaterialia*, 35: 57-67, Apr. 15, 2016.

Neves et al., "Promotion of natural tooth repair by small molecule GSK3 antagonists," *Scientific Reports*, 7: 39654, Jan. 9, 2017 (7 pages).

Palma et al., "Histologic Evaluation of Regenerative Endodontic Procedures with the Use of Chitosan Scaffolds in Immature Dog Teeth with Apical Periodontitis," *Journal of Endodontics*, 43.8: 1279-1287, Mar. 2017.

Prescott et al., "In Vivo Generation of Dental Pulp-like Tissue by Using Dental Pulp Stem Cells, a Collagen Scaffold, and Dentin Matrix Protein 1 after Subcutaneous Transplantation in Mice," *Journal of Endodontics*, 34.4: 421-426, May 2008.

Qu et al., "Complete pulpodentin complex regeneration by modulating the stiffness of biomimetic matrix," *Acta Biomaterialia* 16: 60-70, Jan. 2015.

Song et al., "Decellularized Human Dental Pulp as a Scaffold for Regenerative Endodontics," *Journal of Dental Research*, 96.6: 640-646, Feb. 14, 2017.

Sonoyama et al., "Mesenchymal Stem Cell-Mediated Functional Tooth Regeneration in Swine," *PLoS One* 1: e79, Dec. 2006 (9 pages).

Tan et al., "Regeneration of dentin-pulp-like tissue using an injectable tissue engineering technique," *RSC Advances* 5.73: 59723-59737, Jun. 23, 2015.

Viswanath et al., "Extracellular matrix-derived hydrogels for dental stem cell delivery," J Biomed Mater Res A 105.1: 319-328, Nov. 5, 2016.

Athirasala et al., "A Novel Strategy to Engineer Pre-Vascularized Full-Length Dental Pulp-like Tissue Constructs," *Scientific Reports* 7:3323, Jun. 2017 (11 pages).

Saito et al., "Preparation of gelatin hydrogels incorporating low-molecular-weight heparin for anti-fibrotic therapy," *Acta Biomaterialia* 8(2):646-652, Oct. 2012.

International Search Report and Written Opinion for related International Application No. PCT/US2017/020765, mailed Jun. 19, 2017, 12 pages.

International Search Report and Written Opinion for related International Application No. PCT/US2019/037081, 11 pages, mailed Oct. 10, 2019.

Kwon et al., "Chondroitin sulfate-based biomaterials for tissue engineering," *Turkish Journal of Biology*, 40(2):290-299 (Feb. 23, 2016).

Chau, "Regulation of Growth Plate and Articular Chondrocyte Differentiation: Implications for Longitudinal Bone Growth and Articular Cartilage Formation," Karolinska Institutet, Stockholm, 68 pages (May 16, 2014).

Huebsch et al., "Ultrasound-triggered disruption and self-healing of reversibly cross- linked hydrogels for drug delivery and enhanced chemotherapy," PNAS, 111(27):9762-9767 (Jul. 8, 2014).

Knipe et al., "Multi-responsive hydrogels for drug delivery and tissue engineering applications," Regenerative Biomaterials, pp. 57-65 (Aug. 22, 2014).

Nilsson et al., "Gradients in bone morphogenetic protein-related gene expression across the growth plate," Journal of Endocrinology, 193:75-84 (Jan. 19, 2007).

Phadke et al., "Rapid self-healing hydrogels," PNAS, 109(12):4383-4388 (Mar. 20, 2012).

Rutt, "Molecular Analysis of the Epiphyseal Growth Plate in Rachitic Broilers: Evidence for the Etilogy of the Condition," Master's Thesis, The Ohio State University, 110 pages (2008).

Santo et al., "Controlled Release Strategies for Bone, Cartilage, and Osteochondral Engineering-Part 1: Recapitulation of Native Tissue Healing and Variables for the Design of Delivery Systems," Tissue Engineering, Part B, 19(4):308-326 (Aug. 19, 2013).

Spitters et al., "A Dual Flow Bioreactor with Controlled Mechanical Stimulation for Cartilage Tissue Engineering," Tissue Engineering: Part C, 19(10), 10 pages (Aug. 2013).

Yu et al., "Multifunctional Hydrogel with Good Structure Integrity, Self-Healing, and Tissue-Adhesive Property Formed by Combining Diels-Alder Click Reaction and Acylhydrazone Bond," Applied Materials & Interfaces, pp. 24023-24031 (Oct. 23, 2015).

(56) References Cited

OTHER PUBLICATIONS

Association AD, "AAE Clinical Considerations for a Regenerative Procedure, Revised Jun. 8, 2016," American Dental Association; Chicago, IL, 2016 (10 pages).
Banchs and Trope, "Revascularization of Immature Permanent Teeth with Apical Periodontitis: New Treatment Protocol," Journal of Endodontics 30.4: 196-200, Apr. 2004.
Bick and Frenkel, Clinical Aspects of Heparin-Induced Thrombocytopenia and Thrombosis and Other Side Effects of Heparin Therapy, *Clin. Appl. Thrombosis/Hemostasis* 5: S7-S15, 1999.
Bloemen et al., "Incidence and diagnosis of heparin-induced thrombocytopenia (HIT) in patients with traumatic injuries treated with unfractioned or low-molecular-weight heparin: A literature review," *Injury* 43:548-52, May 2012.
Donnelly et al., "A Chorioallantoic Culture Model to Evaluate Pulp Regeneration Therapies," In Transactions of the AADR/CADR Annual Meeting & Exhibition, Fort. Lauderdale, FL, Mar. 24, 2018 (Abstract).
Donnelly et al., "A Chorioallantoic Culture Model to Evaluate Pulp Regeneration Therapies," *Journal of Endodontics*, Presented at the AAE Foundation 2018 Meeting, Denver, CO, Apr. 26, 2018 (Abstract).
Dregalla et al., "Red blood cells and their releasates compromise bone marrow- derived human mesenchymal stem/stromal cell survival in vitro," *Stem Cell Res Ther.* 12: 547, 2021 (15 pages).
Everts et al., "Assessing clinical implications and perspectives of the pathophysiological effects of erythrocytes and plasma free hemoglobin in autologous biologics for use in musculoskeletal regenerative medicine therapies. A review," *Regenerative Therapy* 11: 56-64, 2019.
Frimat et al., "Hemolysis Derived Products Toxicity and Endothelium: Model of the Second Hit," *Toxins* 11: 660, 2019 (34 pages).
Kim et al., "Review: Regenerative endodontics: a comprehensive review," *International Endodontic Journal* 51.12: 1367-1388, 2018.
Martel et al., "Risk for heparin-induced thrombocytopenia with unfractionated and low-molecular-weight heparin thromboprophylaxis: a meta-analysis," *Blood* 106: 2710-2715, 2005.
Mohammadi, "Systemic and local applications of steroids in endodontics: an update review," *International Dental Journal* 59: 297-304, 2009.
Taboas et al., "Acellular hydrogel regenerates a vascularized tissue producing organized mineral along the instrumented canal wall," Pulp Biology and Regeneration Group Satellite Meeting: Basic and Translational Research in Pulp Biology—Developing Technologies for Regenerating Vital Dental Tissues, Portland, OR, Jun. 2019 (Poster).
Zaky et al., "Effect of the Periapical 'Inflammatory Plug' on Dental Pulp Regeneration: A Histologic In Vivo Study," *J Endod.* 46: 51-56, 2020.
Bernstein et al., "Can Bone Healing in Distraction Osteogenesis Be Accelerated by Local Application of IGF-1 and TGF-Beta1?" J Biomed Mater Res Part B Appl Biomater. 92.1: 215-225, 2010.
Bonewald and Mundy, "Section III: Basic Science and Pathology: Role of Transforming Growth Factor-Beta in Bone Remodeling," Clinical Orthopaedics and Related Research 250: 261-276, Jan. 1990.
Bostrom and Asnis, "Transforming Growth Factor Beta in Fracture Repair," Clinical Orthopaedics and Related Research 355S: S124-S131, 1998.
Ehrhart et al., "Effect of Transforming Growth Factor-Beta1 on Bone Regeneration in Critical-Sized Bone Defects after Irradiation of Host Tissues," Am J Vet Res. 66.6: 1039-1045, 2005.
Einhorn and Gerstenfeld, "Fracture Healing: Mechanisms and Interventions," Nat Rev Rheumatol. 11.1: 45-54, Jan. 2015.
Ekegren et al., "Incidence, Costs and Predictors of Non-Union, Delayed Union and Mal-Union Following Long Bone Fracture," Int J Environ Res. Public Health 15.12: 2845, 2018.
Gao et al., "Advances in Animal Models for Studying Bone Fracture Healing," Bioengineering (Basel) 10: 201, 2023 (18 pages).

Giannoudis et al., "Autologous Bone Graft: When Shall We Add Growth Factors?" Foot Ankle Clin. 15.4: 597-609, 2010.
Heckman et al., "Bone Morphogenetic Protein but Not Transforming Growth Factor-Beta Enhances Bone Formation in Canine Diaphyseal Nonunions Implanted with a Biodegradable Composite Polymer," J Bone Joint Surg Am. 81.12: 1717-1729, Dec. 1999.
Hettiaratchi et al., "Enhanced in Vivo Retention of Low Dose BMP-2 via Heparin Microparticle Delivery Does Not Accelerate Bone Healing in a Critically Sized Femoral Defect," Acta Biomater. 59: 21-32, 2017.
Ho-Shui-Ling et al., "Bone Regeneration Strategies: Engineered Scaffolds, Bioactive Molecules and Stem Cells Current Stage and Future Perspectives," Biomaterials 180: 143-162, Oct. 2018.
Janssens et al., "Transforming Growth Factor-Beta1 to the Bone," Endocr Rev. 26.6: 743-774, 2005.
Katagiri et al., "Bone morphogenetic protein-induced heterotopic bone formation: What have we learned from the history of a half century," Japanese Dental Science Review 51: 42-50, 2015.
Kaur et al., "A segmental defect adaptation of the mouse closed femur fracture model for the analysis of severely impaired bone healing," Animal Model Exp Med. 3: 130-139, 2020.
Levi, "The dual face of heparin in severe infection," Blood 123.7: 947-948, Feb. 2014.
Lind et al., "Transforming Growth Factor-Beta-6 Stimulates Bone Ongrowth. Hydroxyapatite-Coated Implants Studied in Dogs," Acta Orthop Scand. 67.6: 611-616, 1996.
Lind et al., "Transforming Growth Factor-Beta1 Stimulates Bone Ongrowth to Weight-Loaded Tricalcium Phosphate Coated Implants: An Experimental Study in Dogs," J Bone Joint Surg Br. 78B.3: 377-382, May 1996.
Lind et al., "Transforming Growth Factor-Beta1 Adsorbed to Tricalciumphosphate Coated Implants Increases Peri-Implant Bone Remodeling," Biomaterials 22.3: 189-193, Feb. 2001.
Matsuura et al., "Distinct Characteristics of Mandibular Bone Collagen Relative to Long Bone Collagen: Relevance to Clinical Dentistry," Biomed Res Int. 2014: 769414, 2014 (9 pages).
Moses et al., "The Discovery and Early Days of TGF-β: A Historical Perspective," Cold Spring Harb Perspect Biol. 8.7: a021865, 2016 (28 pages).
Moxham et al., "TGF-Beta 1 Forms Functionally Normal Bone in a Segmental Sheep Tibial Diaphyseal Defect," J Otolaryngol 25.6: 388-392, 1996.
Nauth et al., "Critical-Size Bone Defects: Is There a Consensus for Diagnosis and Treatment?" J Orthop Trauma 32: S7-S11, Mar. 2018.
Nikolidakis et al., "Chapter 5: The Effect of a Low Dose of Transforming Growth Factor Betal (TGF-Beta1) on the Early Bone-Healing around Oral Implants Inserted in Trabecular Bone," Doctoral Thesis: Oral Implants: The Effect of Biological Factors on Bone Healing, Department of Periodontology and Biomaterials, Radboud University Nijmegen Medical Center, Nijmegen, The Netherlands, 69-83, 2009.
Olivos-Meza et al., "Pretreatment of Periosteum with TGF-Beta1 in Situ Enhances the Quality of Osteochondral Tissue Regenerated from Transplanted Periosteal Grafts in Adult Rabbits," Osteoarthritis and Cartilage 18.9: 1183-1191, Sep. 2020.
Poniatowski et al., "Transforming Growth Factor Beta Family: Insight into the Role of Growth Factors in Regulation of Fracture Healing Biology and Potential Clinical Applications," Mediators Inflamm. 2015: 137823, 2015 (17 pages).
Raschke et al., "Insulin-like Growth Factor-1 and Transforming Growth Factor-Beta1 Accelerates Osteotomy Healing Using Polylactide-Coated Implants as a Delivery System: A Biomechanical and Histological Study in Minipigs," Bone 30.1: 144-151, 2002.
Reyes et al., "Effect of Triple Growth Factor Controlled Delivery by a Brushite-PLGA System on a Bone Defect," Injury 43.3: 334-342, 2012.
Reyes et al., "Repair of an Osteochondral Defect by Sustained Delivery of BMP-2 or TGFβ1 from a Bilayered Alginate-PLGA Scaffold," J Tissue Eng Regen Med. 8.7: 521-533, 2014.
Ripamonti et al., "Bone Induction by BMPs/OPs and Related Family Members in Primates," J Bone Joint Surg Am. 83A Suppl 1 (Pt. 2): S116-127, 2001.

(56) References Cited

OTHER PUBLICATIONS

Roddy et al., "Treatment of critical-sized bone defects: clinical and tissue engineering perspectives," Eur J Orthop Surg Traumatol. 28: 351-362, 2018.

Schlickewei et al., "Current and Future Concepts for the Treatment of Impaired Fracture Healing," Int J Mol Sci. 20.22: 5805, 2019 (26 pages).

Schouten et al., "Effects of Implant Geometry, Surface Properties, and TGF-Beta1 on Peri-Implant Bone Response: An Experimental Study in Goats," Clin Oral Implants Res. 20.4: 421-429, 2009.

Schultz et al., "Gelation of Covalently Cross-Linked PEG-Heparin Hydrogels," Macromolecules 42.14: 5310-5316, Jul. 2009.

Servin-Trujillo et al., "Use of a Graft of Demineralized Bone Matrix along with TGF-B1 Leads to an Early Bone Repair in Dogs," J Vet Med Sci. 73.9: 1151-1161, 2011.

Sherris et al., "Mandibular Reconstruction with Transforming Growth Factor-Beta1," Laryngoscope 108.3: 368-372, 1998.

Shigeno et al., "Regenerative Repair of the Mandible Using a Collagen Sponge Containing TGF-Beta1," Int J Artif Organs. 25.11: 1095-102, Nov. 2002.

Stewart, "Fracture Non-Union: A Review of Clinical Challenges and Future Research Needs", Malays Orthop J. 13.2: 1-10, Jul. 2019.

Sun et al., "Role of Transforming Growth Factor Beta (TGF-Beta) in Repairing of Bone Defects," Chin Med Sci J. 11.4: 209-214, Dec. 1996.

Sun et al., "Evaluation of Transforming Growth Factor Beta and Bone Morphogenetic Protein Composite on Healing of Bone Defects," Chin Med J. 110.12: 927-931, 1997.

Sun et al., "Collagen-Hydroxyapatite/Tricalcium Phosphate Microspheres as a Delivery System for Recombinant Human Transforming Growth Factor-Beta 1," Artificial Organs 27.7: 605-612, 2003.

Szivek et al., "Transforming Growth Factor-Beta1 Accelerates Bone Bonding to a Blended Calcium Phosphate Ceramic Coating: A Dose-Response Study," J Biomed Mater Res A 68.3: 537-543, 2004.

Teixeira et al., "Skeletal tissue regeneration: where can hydrogels play a role?" International Orthopaedics (SICOT) 38: 1861-1876, 2014.

Wang et al., "Calvarial versus Long Bone: Implications for Tailoring Skeletal Tissue Engineering," Tissue Engineering: Part B 26.1: 46-63, 2020.

Zhang et al., "Advancements in Hydrogel-Based Drug Sustained Release Systems for Bone Tissue Engineering," Front Pharmacol. 11: 622, 2020 (13 pages).

Aufdemorte et al., "An Intraosseous Device for Studies of Bone-Healing," The Journal of Bone and Joint Surgery 74-A.8: 1153-1161, 1992.

Da Silva Feitosa et al., "Thyroid Hormones May Influence Cortical Bone Healing Around Titanium Implants: A Histometric Study in Rats," J Periodontol. 79.5: 881-887, 2008.

Daugaard et al., "The combined effect of parathyroid hormone and bone graft on implant fixation," J Bone Joint Surg Br. 93.1: 131-139, Jan. 2011.

"Definition of Layer", Google Search, printed Sep. 24, 2024 (1 page).

Faghihi et al., "The effect of purmorphamine and sirlimus on osteogenic differentiation of human bone marrow-derived mesenchymal stem cells," Biomedicine and Pharmacotherapy 67: 31-38, 2013.

Hoffman, "Hydrogels for biomedical applications," Adv Drug Deliv Rev. 54.1: 3-12, Jan. 2002.

Kaminski et al., "pH-Sensitive Genipin-Cross-Linked Chitosan Microspheres for Heparin Removal," Biomacromolecules 9: 3127-3132, 2008.

Lerner, "Transforming Growth Factor-$\beta$ Stimulates Bone Resorption in Neonatal Mouse Calvariae by a Prostaglandin-Unrelated but Cell Proliferation-Dependent Pathway," Journal of Bone and Mineral Research 11.11: 1628-1639, 1996.

Lind, "Growth factor stimulation of bone healing," Acta Orthopaedica Scandinavica 69:Sup 283: 1-37, 1998.

Riederer et al., "Dual Delivery Biomaterial System for the Treatment of Growth Plate Injuries," Tissue Engineering—Part A 20, Suppl. 1, S-32, Abstract No. O-385, Meeting Info: 2014 TERMIS-AM Conference, Washington, DC (Dec. 13-16, 2014), Dec. 2014 (1 page).

Sinha et al., "Chitosan microspheres as a potential carrier for drugs," International Journal of Pharmaceuticals 274: 1-33, 2004.

Sumner et al., "Enhancement of Bone Ingrowth by Transforming Growth Factor-$\beta$," The Journal of Bone and Joint Surgery 77-A.8: 1135-1147, Aug. 1995.

\* cited by examiner

PGH Hydrogel

G Hydrogel $$\frac{C(r,t)}{C_\infty} = 1 - \sum_{m=1}^{\infty} \frac{2}{\alpha_{m0} J_1(\alpha_{m0})} e^{-\alpha_{m0}^2 D} J_0(\alpha_{m0} L)$$

= normalized fluorescence

Equation: Analytical solution to Fick's 2nd law for radial diffusion in a cylinder.

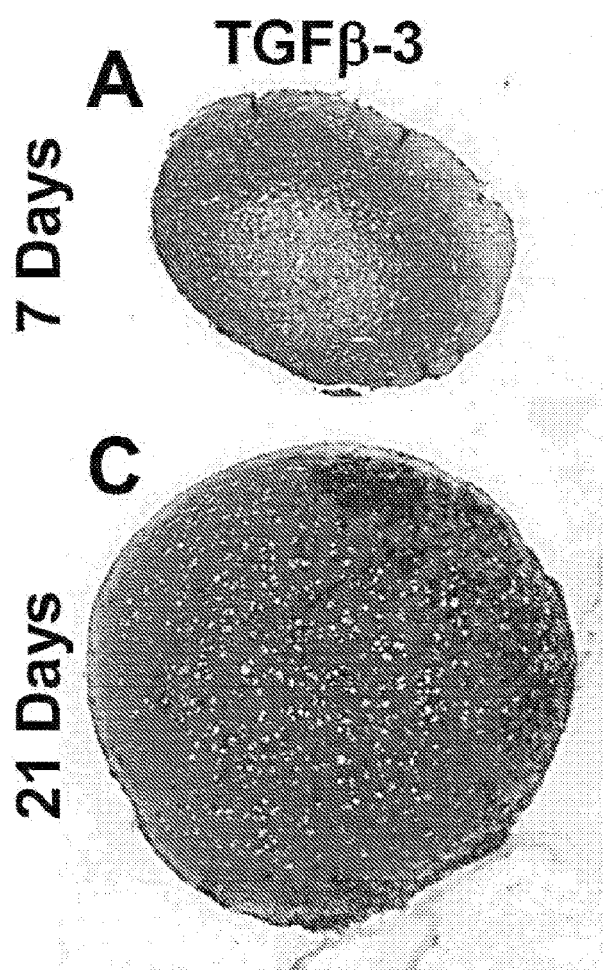
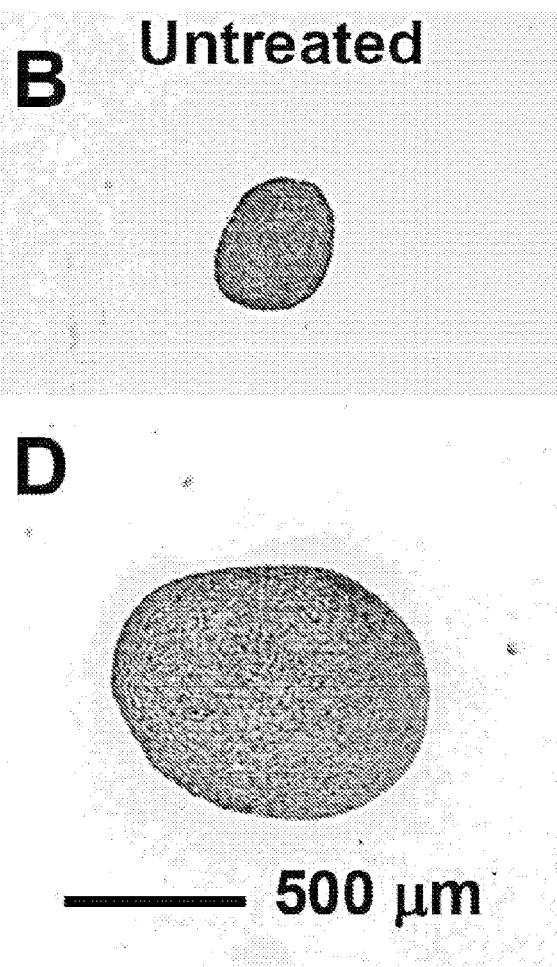
FIG. 5A  FIG. 5B
FIG. 5C  FIG. 5D

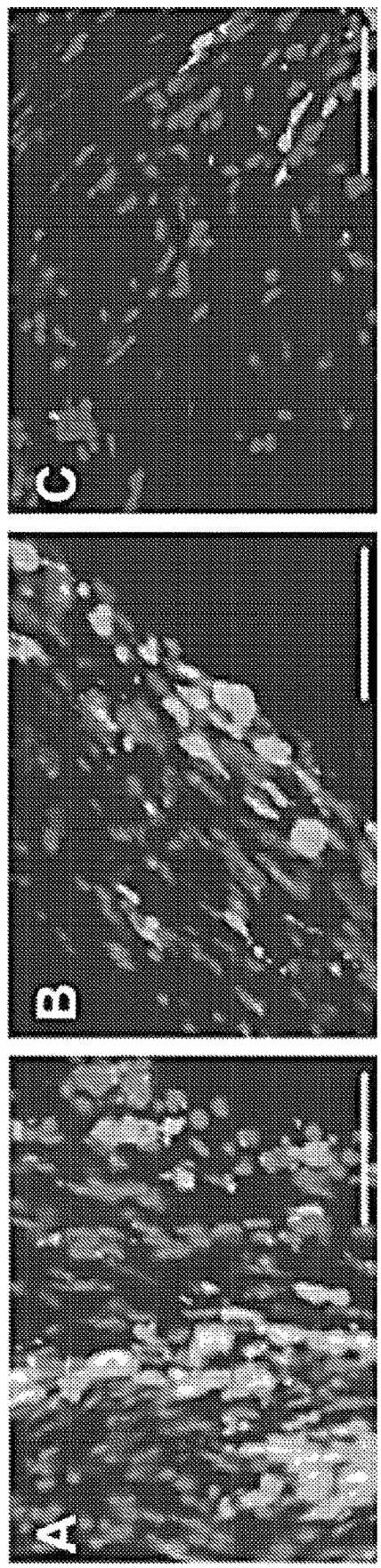

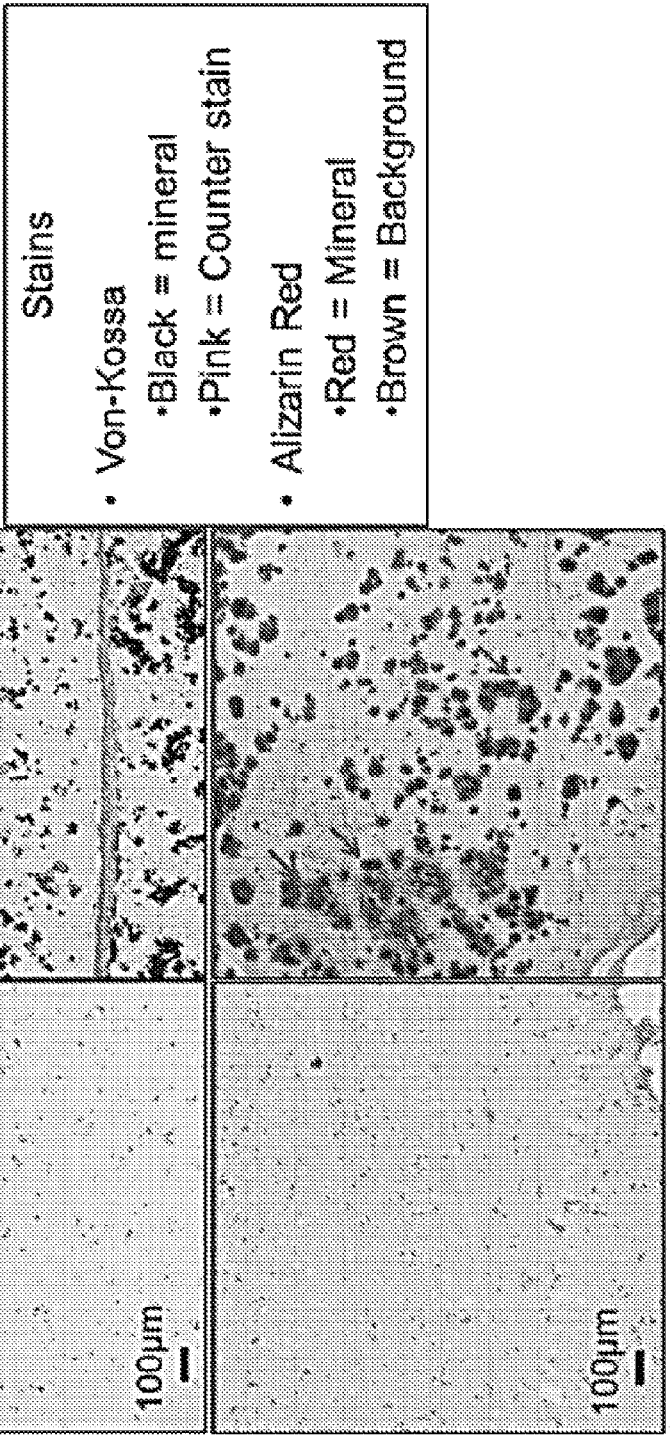

Relative Glycosaminoglycan Content

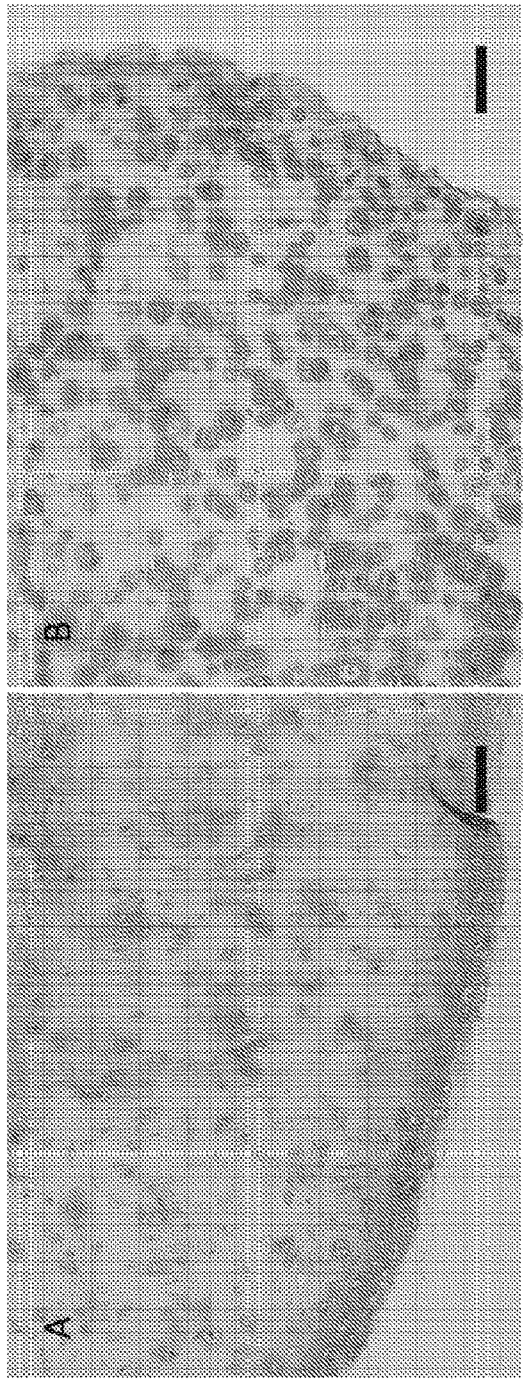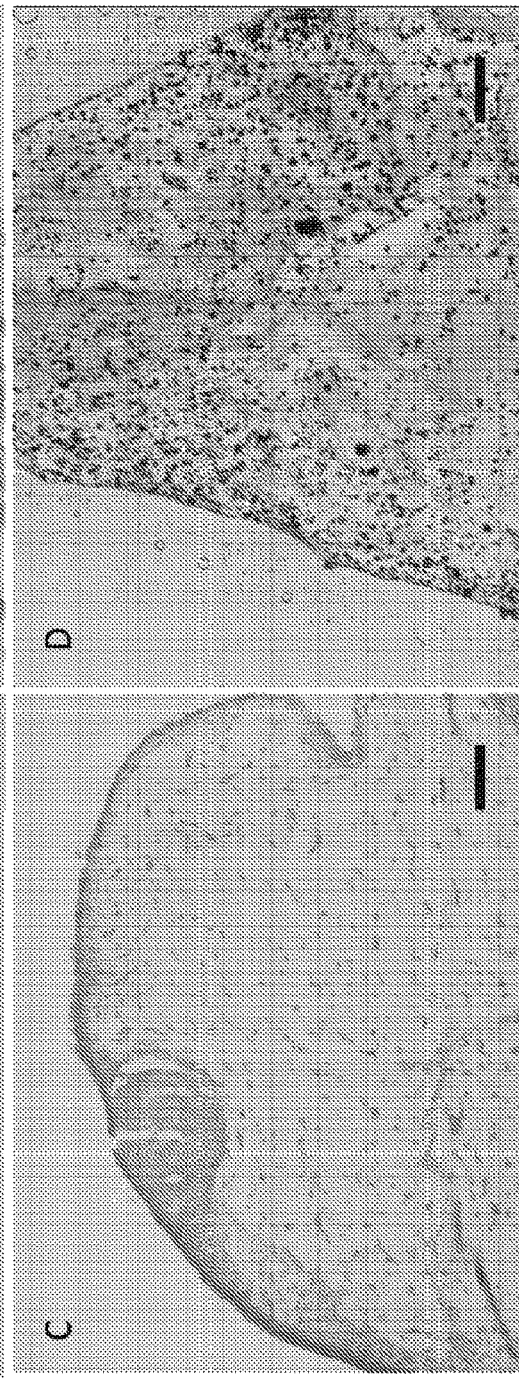
FIG. 12A  PGH Hydrogel
FIG. 12B  GEL Hydrogel
FIG. 12C  Safranin O
FIG. 12D  Von Kossa  Scale bar = 200 μm Safranin O Stain: Red = Glycosaminoglycan (GAG)

Chondrogenicity
(% of cells secreting GAGs)

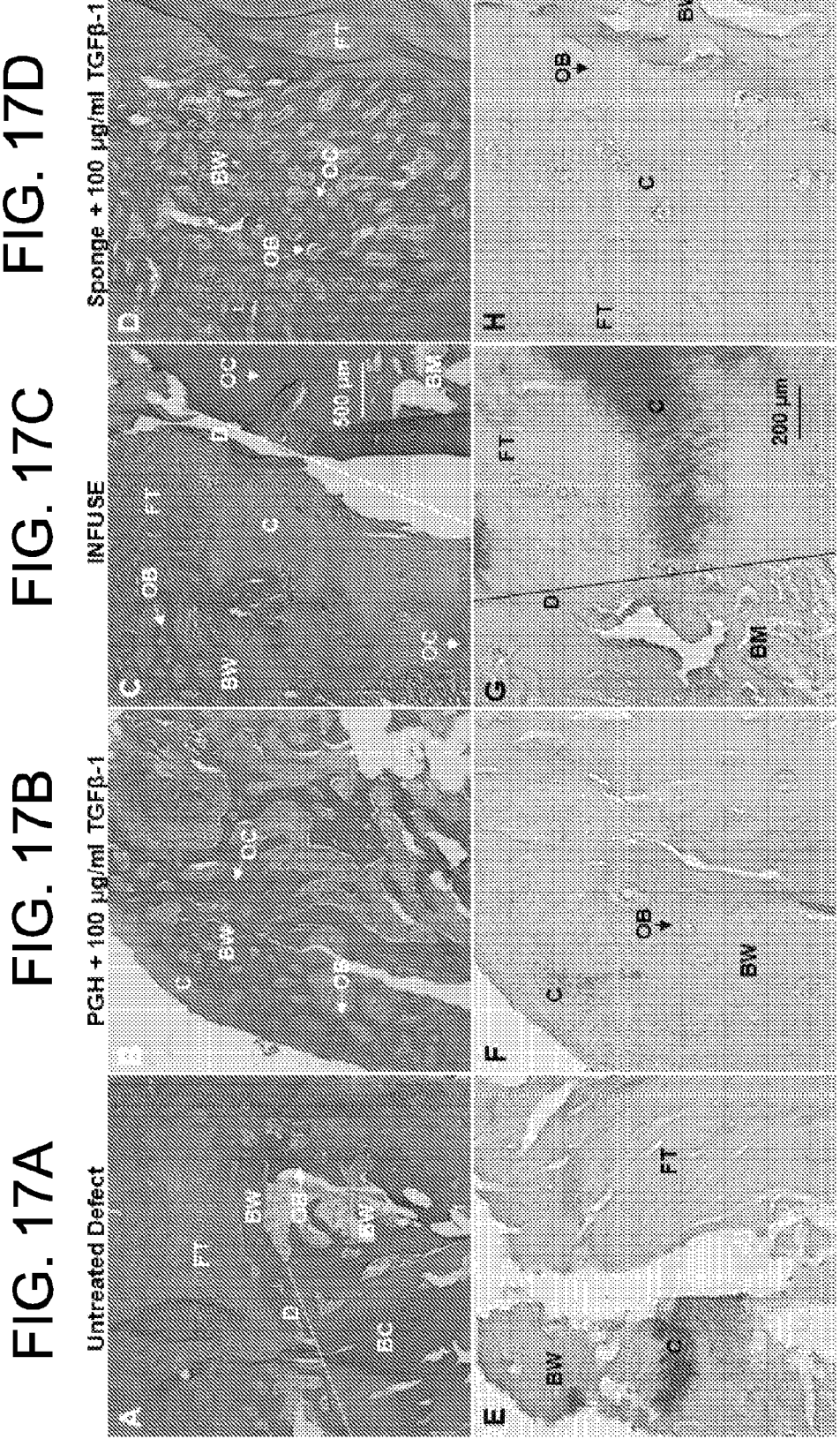

FIG. 18A
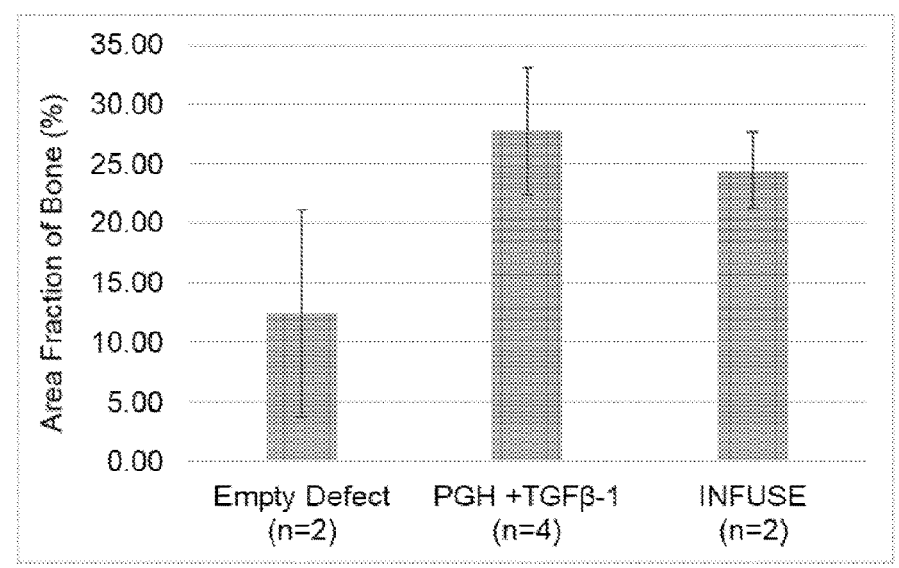
FIG. 18B  FIG. 18C  FIG. 18D
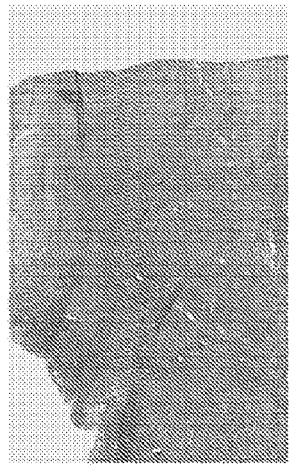  

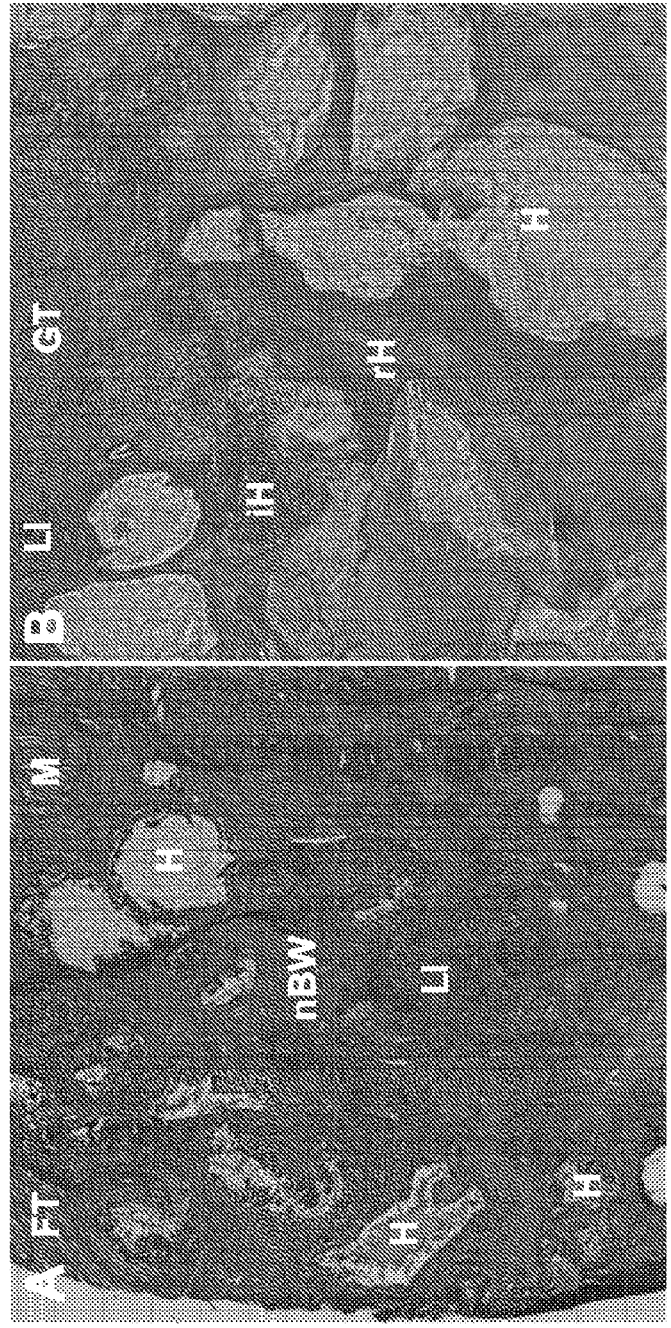

BONE REGENERATION IN COMPROMISED WOUNDS

CROSS-REFERENCE TO RELATED APPLICATIONS

This application is the U.S. National Stage of International Application No. PCT/US2019/037081, filed Jun. 13, 2019, which claims the benefit of U.S. Provisional Patent Application No. 62/684,401 filed Jun. 13, 2018, which is incorporated by reference herein in its entirety. In addition, International Patent Application PCT/US2017/020765, published as WO2017/152112 on Sep. 8, 2017, is incorporated by reference herein. These disclosures are considered part of this application.

ACKNOWLEDGMENT OF GOVERNMENT SUPPORT

This invention was made with government support under grant number AR062598 awarded by the NIH, and under grant number W81XWH-16-1-0793 awarded by the U.S. Army Medical Research and Materiel Command. The government has certain rights in the invention.

FIELD

This disclosure is related to materials, devices, and methods for regenerating bone and other tissues in compromised wounds.

BACKGROUND

Some people, such as military personnel, are substantially burdened with traumatic bone injury to the extremities, but no ideal therapy is available to regenerate large bone volumes in compromised wounds. These wounds are suboptimal for regeneration because the vascular damage and immune responses provoke hypoxia and inflammation which impair bone neogenesis and drive aberrant fibrosis. Accordingly, there is a need for improved materials, devices, and methods for regenerating bone and other tissues in compromised wounds.

SUMMARY

Targeting the inflammatory response at the injury site is a critical point in acute care where bone healing can be improved. A period of acute inflammation is necessary for regeneration, but prolonged inflammation is deleterious leading to non-unions. Whether repair follows a pro-inflammatory path leading to fibrosis, or a regenerative path resulting in cartilaginous callus and/or woven bone, depends to a significant degree on the phenotype of the leukocyte infiltrate. The clinically available biologic INFUSE (bone morphogenetic protein 2 loaded collagen sponge) does drive bone formation, but elicits a deleteriously pro-inflammatory response. The disclosed technology describes materials, devices, and methods for treating fracture and segmental bone defect, among other applications. The technology potentiates bone regeneration by driving differentiation of infiltrating leukocytes down a regenerative pathway and by promoting osteogenic differentiation of stem cells. It promotes less fibrous tissue growth and more bone regeneration (intramembranous and endochondral ossification) in bone defects than no treatment controls, and with less local pro-inflammatory leukocytes and ectopic bone than INFUSE treated boney defects.

Exemplary biomaterials disclosed herein can comprise a hydrogel comprising PEG, gelatin, and a glycosaminoglycan with sulfated moiety; and chondrogenic, osteogenic, and immunomodulatory cytokines; wherein the biomaterial is capable of potentiating bone regeneration in a compromised wound while reducing inflammatory response. The glycosaminoglycan with sulfated moiety can comprise heparin, heparan sulfate, keratin sulfate, chondroitin sulfate, dermatan sulfate, and/or similar materials. The biomaterial can further comprise mesenchymal stem cells (MSCs), a cross-linking initiator, microparticles and nanoparticles, and or other materials. The biomaterial can be injectable into a wound, or the biomaterial can be loaded in, or further comprise a porous scaffold providing mechanical support for other components of the biomaterial, such that it can be implanted into a wound.

In the biomaterials, a ratio of the glycosaminoglycan with sulfated moiety to the PEG by mass can be 1/1 or greater. In some embodiments, a ratio of the gelatin to the PEG by mass is 1/1 or greater. For example, in one embodiment the hydrogel comprises PEG, gelatin, and heparin in a 3:4:3 proportion by mass. Such compositions with higher levels of the glycosaminoglycan with sulfated moiety can provide a desired level of immunoinflammatory suppression.

In some embodiments, the hydrogel comprises from 7.5% to 8.5% by mass of PEG, gelatin, and a glycosaminoglycan with sulfated moiety to the volume of hydrogel. A majority of rest of the biomaterial can comprise saline, water, or other liquids, for example.

In some embodiments, the cytokines comprise TGFβ-1 and/or TGFβ-2. For example, the biomaterial can comprise from 10 μg/ml to 1 mg/ml of the TGFβ-1 or TGFβ-2, such as from 70 μg/ml to 100 μg/ml of the TGFβ-1 or TGFβ-2. The cytokines can further comprise IL-10 or IL-4. In some embodiment, a ratio by mass of IL-10 to TGFβ-1 is from 1/10 to 3/10.

In some embodiments, the biomaterials can comprise coacervates. More information regarding coacervates and biomaterials can be found in WO2017/106333A1, which is incorporated by reference herein.

The disclosed biomaterials may only provide a short time frame to be introduced into a wound site once constituted until the effectiveness of the biomaterial is significantly reduced. However, components of the biomaterial may be stored separately for longer periods of time, and then mixed together a time near when the biomaterial is to be introduced into a wound site. In some embodiments, the biomaterial can be constituted by mixing a dry material, such as a powder or porous structure, with a liquid. For example, the liquid can comprise saline and/or water, and the rest of the components of the biomaterial can constitute the dry material. In some embodiments, the dry material and the liquid can be separately contained in two chambers of a container until ready for use. Such a container can be portable, for example, to be usable in the field, such as in a combat zone. In some embodiments, the container comprises a syringe or other injection device configured to inject the biomaterial into a compromised wound after the dry material and liquid are mixed together. For example, the syringe can have two chambers for a powder and a liquid that are mixed prior to injecting the resulting biomaterial into a wound site. In some embodiments, the container can comprise a removable or openable seal that joins the first and second chambers and allows the liquid and the dry material to mix within the container. In some embodiments, the container is openable such that, after the dry material and liquid are mixed together to form the biomaterial, the biomaterial can be removed from the container and implanted into a compromised wound.

In some embodiments, the hydrogel can be formed by radical initiated crosslinking with light sensitive initiators and/or peroxides, while others with amine reactive crosslinkers, such as tetrakis for example, which can be applied in an injectable formulation, for example.

In some embodiments, the methods can comprise immunomodulation of the injected material. Immunomodulation can be performed using cytokines and/or other drugs that are not cytokines, such as tacrolimus and dexamethasone.

In some embodiments, the material can comprise gradients in growth factors and/or cytokines, while in other embodiments no such gradients are included.

In some embodiments, the materials include self-segregating microparticles or nanoparticles.

The disclosed PGH hydrogels can be used in a variety of methods, such as methods for bone regeneration via endochondral ossification of both 1) segmental bone defect and 2) fracture including comminuted fracture.

This disclosure describes applications of PGH hydrogels with and without stem cells and delivery of TGF-β1 and IL-10 for osteogenic, chondrogenic and immunomodulatory purposes. Though TGFβ-1 is highly sequestered in bone, TGFβs have not shown clinically applicable improvement in bone healing of segmental bone defects in large animal models, likely due to stability and delivery issues.

BRIEF DESCRIPTION OF THE DRAWINGS

FIGS. 2A-2D show a multiplex assay at 3 weeks testing chondrocytes at 3 differentiation states: Z1=proliferative, Z2=prehypertrophic, Z3=hypertrophic. PGH hydrogel (FIG. 2A) promotes more cartilage matrix secretion than G hydrogel (FIG. 2B) shown by red glycosaminoglycan stain (red=Safranin 0, green=Fast Green, purple=Hematoxylin). PGH hydrogel (FIG. 2C) inhibits mineralization by hypertrophic chondrocytes compared to G hydrogel (FIG. 2D) shown by no black stain (black=Von Kossa, pink=Eosin). FIGS. 2E and 2F show multiplex assay at 1 week. PGH hydrogel (FIG. 2E) delays terminal differentiation of pre-hypertrophic chondrocytes compared to G hydrogel (FIG. 2F) shown by less green immunostaining for Collagen Type 10α1 (blue=DAPI). PGH hydrogel maintains hypertrophic chondrocytes in an early hypertrophic state with continued glycosaminoglycan deposition. The G component promotes hypertrophy and mineralization of stem cell derived chondrocytes. Black bar=0.5 mm, white bar=0.2 mm.

FIG. 3A shows a millifluidic device with control well (left) and permeability chamber (>300 μl, right) containing 1.0 mm high×2.0 mm diameter cylindrical 10% (w/v) P hydrogel in center (3 μl volume, arrow). Stars=access ports. FIG. 3B is a graph showing diffusion of Dex3 at 25 nM into cylinder. Valleys in plots at cylinder walls are produced by diffraction (immersion flow from right to left). FIG. C is a graph illustrating partitioning of four surrogate morphogens in PEG cylinders. Partition coefficient is <1 for the Dexs (Dextrans), decreasing with increasing molecular weight (Dex3=3 kDa @160 nm, Dex10=10 kDa @25 nM, Dex70=70 kDa @10 pM). The coefficient is >1 for sulforhodamine (SFR), which did not reach equilibrium even at 80 μM.

FIG. 4A shows a growth factors and cytokines complex with the coacervate components heparin (green) and poly(ethylene argininylaspartate diglyceride (blue) via electrostatic interactions (circles with green edge). Some biofactors are also physically entrapped in the coacervate (circles with blue edge). FIG. 4B shows that drug release exhibits two phases, an early release of physically entrapped biofactor followed by prolonged delivery of complexed growth factor.

FIGS. 5A-5D illustrates how stimulation with TGFβ-3 promotes chondrogenic differentiation of human MSCs in pellet culture in vitro compared to no TGF controls in serum-free chemically-defined medium. Glycosaminoglycans=red (Safranin O), fibrous tissue=green (Fast Green), cells=purple (Hematoxylin).

FIG. 6D compares their bone volumes to a control.

FIGS. 7A-7C illustrates how stimulation with anti-inflammatory factors significantly reduced chronic inflammation in hypoxic tissues. FIG. 7A shows phagocyte infiltration (green=CD68+ cells) in ischemic mouse myocardium. FIG. 7B shows decreased phagocytes with injected (IL-10 and bFGF). FIG. 7C shows further decrease in phagocytes with coacervate release (bar=100 um, blue=DAPI).

FIG. 8A shows that the pores are of at least 400 μm diameter. FIG. 8B shows that the interconnectivity between pores is at least 60 μm. FIG. 8C shows that the majority (greater than 70%) of the pores in the scaffold are of 400 μm or greater, with a small fraction (approximately 8%) ranging from 60 to 85 μm as determined with mercury porosimetry. Bar=100 μm (FIGS. 8A,8C).

FIG. 9A shows normal fibrocartilage and subchondral bone of the condyle. At 3 months, untreated defects (about 8 mm deep×5 mm wide) show granulation tissue in the bone defect (FIG. 9B) and little formation of fibrocartilage (FIG. 9C). Hydrogel treated defects show regenerate fibrocartilage that is contiguous with surrounding tissue and no granulation tissue in bone.

FIG. 10 illustrates how an exemplary PGH hydrogel inhibited osteogenesis compared to GEL, shown by Vonkossa and Alizarin red stainings. Black dots here are phosphate, indicated by the red arrows. and red dots here are calcium, indicated by the blue arrows.

FIG. 11A shows that PGH drives greater gene expression of chondrogenic markers, and less expression of osteogenic markers, than GEL. FIG. 11B shows that more stem cells undergo chondrogenic differentiation in PGH than in GEL. FIG. 11C shows that stem cell derived chondrocytes secrete more glycosaminoglycans, and marker of cartilage matrix synthesis, in PGH than GEL.

FIGS. 12A-12D compare chondrogenesis vs. osteogenic culture in vitro. Both PGH and GEL support chondrogenesis by stem cells in chondrogenic culture conditions as evidenced by Safranin O staining (FIG. 12A and FIG. 12B, respectively). However, PGH inhibits osteogenic differentiation of stem cells in osteogenic culture conditions as evidenced by lack of Von Kossa staining (FIG. 12C versus FIG. 12D respectively).

FIGS. 17A-17H illustrates the efficacy of the PGH hydrogel containing TGFβ-1 at treating bone defects in comparison to "INFUSE" and control untreated defects. FIG. 17B shows that PGH containing TGFβ-1 lead to significant woven bone formation in 3 cm segmental fibular defects in minipigs after one month growth as evidenced by lack of lamellar structure and high osteocyte content compared to the cortical bone. Woven bone contained high osteocyte density (OCs) and active osteoid surfaces lined with osteoblasts (OBs). FIG. 17A shows that untreated defects produce woven bone near the osteotomy site but no bone in the defect proper. FIG. 17C shows that INFUSE also yielded woven bone regeneration in the defect. FIG. 17D shows that the gelatin sponge with TGFβ-1 also produced significant woven bone in the defect proper. FIG. 17F shows that PGH scaffolds also yielded some cartilage (G). FIG. 17G shows that INFUSE yielded more cartilage evident at one month than treatments with TGFβ-1. INFUSE also yielded ectopic bone (not shown). BC=Cortical Bone, BW=Woven Bone, BM=Bone Marrow, FT=Fibrous Tissue, C=Cartilage, M=Muscle, D=Osteotomy Margin, OB=Osteoblast, OC=Osteoclast. (A-D stains: pink=bone and fibrous tissue via eosin, violet=cartilage and dark purple=cell nucleus via hematoxylin. E-F stains: red=cartilage via Safranin O, Green=bone and fibrous tissue via fast green)

FIGS. 18A-18D illustrate the efficacy of PHG hydrogel at treating bone defects in comparison to "INFUSE" and a control sample. FIG. 18A demonstrates that the PGH hydrogel containing TGFβ-1 at 100 µg/ml is superior to INFUSE at $1/15^{th}$ of the dose of INFUSE, yielding significant woven bone and pockets of cartilage at one month, with less inflammation and ectopic bone. FIG. 18B is a representative picture of regenerate tissue in an untreated defect site at 1 month. FIG. 18C is a representative picture of regenerate tissue in a defect treated with PGH containing TGFβ-1 at 100 µg/ml. FIG. 18D is a representative picture of regenerate tissue in a defect treated with INFUSE.

FIGS. 20A and 20B show that the PGH hydrogel with TGFβ-1 undergoes resorption over two weeks in vivo through several stages, including cell infiltration (iH) and cell mediated resorption (rH). In that time, fibrous tissue (FT), leukocyte infiltrate (LI), and neo-woven bone (nBW) are formed. H=PGH hydrogel, iH=cell infiltrated PGH, rH=degrading PGH, GT=Granulation Tissue, M=Muscle (Eosin stain: pink=bone, fibrous tissue, cell cytoplasm, dark pink=iH, light diffuse pink=rH; Hematoxylin stain: light violet=PGH hydrogel, violet=cartilage, and dark purple=cell nucleus).

FIG. 21A shows the sponge scaffold. FIG. 21B shows the sponge placed in a mold and filled with the liquid precursor of the PGH hydrogel containing growth factors. The mold serves to contain the liquid hydrogel precursor prior to gelation and hydrogel formation. FIG. 21C shows the implant containing the PGH hydrogel with cytokines.

DETAILED DESCRIPTION OF EXEMPLARY EMBODIMENTS

The following describes a pre-clinical investigation of certain particular embodiments of the herein disclosed technology, which embodiments are designed to regenerate volumes of bone in compromised wounds. The following description does not limit the full scope of this disclosure, but rather provides a detailed description of certain representative examples of the disclosed technology.

Investigation of Exemplary Embodiments

Figure 1:
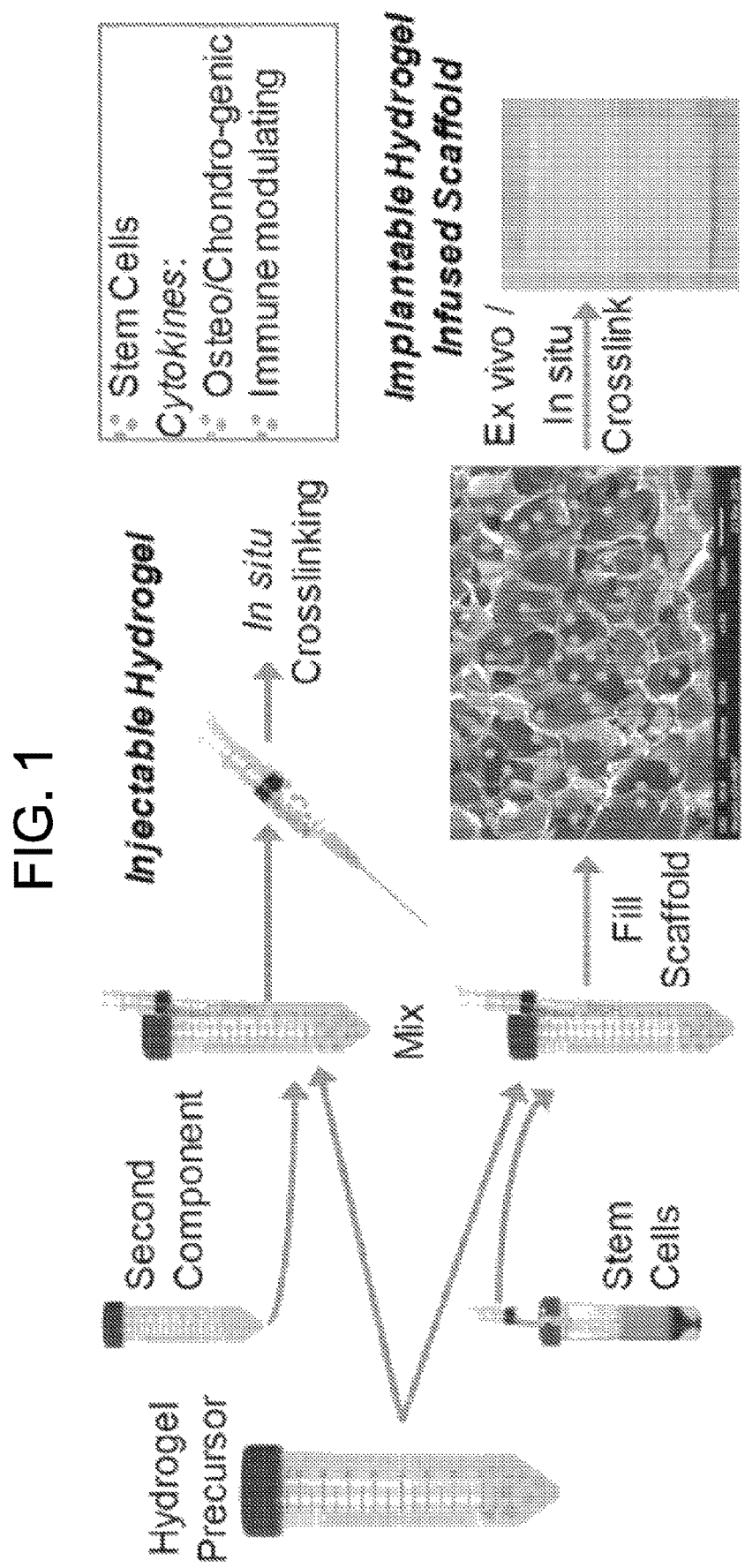
FIG. 1 illustrates an exemplary point-of-care application of bone regeneration materials, devices, and methods disclosed herein.

The JPC-8/CRMRP ERTTDA focus area of this particular investigation is "treatments for bone healing" at the extremities. This example includes biologic material and devices that can be loaded with minimally manipulated autologous mesenchymal stem cells (MSCs) at the point-of-care (FIG. 1). It can comprise one or more of the following components:

1. hydrogel carrier for cytokines and MSCs
2. nanoparticles for prolonged cytokine delivery
3. chondrogenic and immunomodulatory cytokines
4. porous scaffold providing mechanical support The device can be applied via two different modalities depending on the nature of the bone injury: an Injectable Hydrogel device consisting of components 1, 2, and 3 and an Implantable Hydrogel Infused Scaffold device consisting of all components (1 through 4). The injectable hydrogel is used to treat comminuted fractures and small bone deficits while the implantable hydrogel infused scaffold is used to treat large bone deficits.

(i) Hydrogel: The hydrogel serves as a carrier for the cytokines and MSCs and controls the MSC differentiation. It preserves and promotes cytokine activity via the hydrated environment and direct binding of the cytokines. It promotes MSC chondrogenesis and endochondral ossification through its hydrophilic nature, support of spherical cell shape, and enhancement of the chondrocyte phenotype.

(ii) Nanoparticles: The nanoparticles are coacervates (aggregates of colloidal droplets) of heparin and a synthetic polymer that bind the cytokines via charge interactions and thereby stabilize and protect the cytokines and prolong their release.

(iii) Cytokines: The cytokines are transforming growth factor beta-3 (TGFβ-3) and interleukin-10 (IL-10). TGFβ-3 is a potent inducer of chondrogenesis by MSCs. Both IL-10 and TGFβ-3 serve to modulate the immune response, promoting alternate activation of macrophages (M2 phenotype) and a more non-fibrotic healing response.

(iv) Scaffold: The porous scaffold is made from the same polymers as the hydrogel and provides structural integrity to the implantable device in large defects.

Indication: We believe that an injectable device (components 1-3) can be used by first responders to stabilize bone fragments in comminuted fractures, prevent fibrous tissue ingrowth, and rapidly initiate regeneration, for example. We believe that an implantable device (all components) can be used in the operating theater to promote bone formation and minimize non-union when conventional autografts and bone fillers are contraindicated, for example. The MSCs and an immunomodulatory cytokines make the wound environment more conducive to regeneration while the hydrogel creates an anti-fibrotic barrier. The hydrogel and a chondrogenic cytokine drive cartilage formation by the MSCs. This neo-cartilage is similar to the cartilage callus formed during limb fracture healing and undergoes endochondral ossification to produce bone in wounds with compromised vascularity. Thus, the device mitigates hypoxia and non-union by local immunomodulation via the cytokines and MSCs, by shielding the wound site and MSCs, and by regenerating bone through a cartilaginous intermediate. This approach will eventually benefit the 5-10% of patients with fractures that suffer delayed healing and non-union. We will evaluate our device in two bone injury models in Yorkshire swine. We will test the injectable device in bi-lateral simulated comminuted fractures of the fibulas while the implantable device in bi-lateral fibular segmental defects. We will evaluate bone formation and strength, revascularization and reinnervation, and the local and host immune responses. We will compare efficacy relative to current standards of care.

Clinical Outcomes: The results of this large animal study will be directly applicable to treatment of bone injury at the extremities. First, the immunomodulatory results of the selected cytokines and MSCs may alone be applied to enhance bone regeneration in other biologicals. Second, we separately test the efficacy of the cytokines vs. MSCs in local immunomodulation of the repair site to identify if MSCs are essential to repair. Third, the efficacy results of the coacervate drug delivery will open the marketability of these easy to assemble nanoparticles for treatment of numerous injuries and diseases. Fourth, the skeletogenic results of the hydrogel will support its application as a tissue glue to promote repair of numerous bone injuries in addition to those investigated in this research application. Fifth, the bone regeneration results of the integrated device (all components) will directly benefit individuals recovering from bone injury at the extremity because they will demonstrate enhanced repair over currently available therapies. We test our device against the current most common standard of care, plating alone for comminuted fractures and use of Infuse (a biologic bone void filler) for large bone defects. The device will fare better in compromised wounds because it locally mitigates fibrosis and hypoxia by modulating the local immune response and by regenerating bone through endochondral ossification. The regenerate cartilage is similar to physeal growth plate cartilage as well as fracture callus cartilage, which are avascular by nature but recruit blood vessels in the process of maturing to bone (endochondral ossification). Thus, the cartilaginous intermediate in endochondral ossification contributes to local revascularization and is more tolerant of the vascular damage in wounds than bone grafts and biologics which promote intramembranous ossification (bone formation without cartilage). In addition, the hydrogel inhibits fibrous tissue invasion and protects encapsulated cells from the immunological response.

Scientific Rationale: Our bone regeneration device will promote healing in compromised wounds because it addresses the critical limiting factors in repair: low osteo/chondro-progenitors, low vascular supply, and a fibrotic immune response. The rationale and data supporting the design and efficacy is organized below by component.

1. Hydrogel: We have encapsulated cells and drug delivery vehicles in rapidly forming hydrogels that are biocompatible and mechanically sound. The hydrogel consists of three polymers tailored to provide cellular cues for differentiation, adhesion, drug binding, and receptor signaling: poly(ethylene glycol) (PEG), collagen or gelatin (G), and heparin (H). We have focused on developing chondrogenic hydrogels that reconstitute intracellular signaling pathways which are important for formation of complex cartilaginous tissues, namely the growth plate. We tailor the polymeric composition of our hydrogel to control its permeability to cytokines and growth factors and thereby promote physiologic intercellular signaling and growth. The PEG component provides a virtually bio-inert hydrated micro-environment which supports high nutrient/waste exchange and cell viability. It also provides mechanical stability by resisting cell mediated contraction of the hydrogel. PEG is neutrally charged and relatively hydrophobic with low electrostatic interactions with cytokines. The G component provides for cell adhesion, integrin signaling, and growth factor binding (including TGFs). It promotes cell viability compared to PEG-only gels and mimics the growth factor and cytokine binding properties of natural collagenous matrices. Basic cytokines can complex with gelatin (denatured collagen) via electrostatic interactions. Gelatin also provides integrin-mediated adhesion sites that are necessary for chondrocyte reorientation and hypertrophic differentiation. The H component improves growth factor retention, potentiates their signaling, and serves as an analogue of heparan sulfated glycosaminoglycans. H binds cytokines and further potentiates their signaling due to its structural similarity to heparan sulfate. HS-containing proteoglycans are co-receptors for over 200 proteins. We use this same H component in the fabrication of the drug delivery nanoparticles because of its binding of cytokines.

The hydrogel polymers can be made photochemically crosslinkable (photopolymerizable) under radical addition via methacrylation of the polymers and addition of a biocompatible photoinitiator such as lithium phenyl-2,4,6-trimethylbenzoyl phosphinate. Such modified polymers may be crosslinked with peroxides, They can be made chemically crosslinkable under thiol-Michael addition (i.e. thiol-click chemistry, thiol-ene reaction) via thiol-modification of one or more of the polymer component (e.g. G or H) and methacrylation of the others. Amine reactive cross-linkers such as tetrakis may also be used. In this work, we use photopolymerization in fabricating the hydrogel infused porous scaffold device because it polymerizes rapidly (within 3 minutes), while thiol-ene crosslinking for the injectable hydrogel device because no light is required.

Figure 2A:
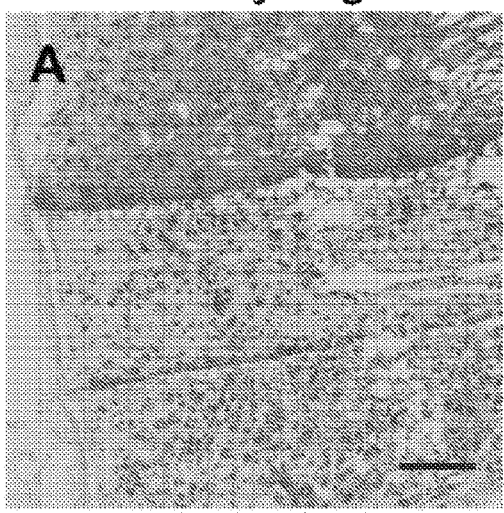
FIGS. 2A-2F illustrate how hydrogel composition controls chondrogenesis and endochondral ossification of subcutaneous implants in mice.
Figure 2B:
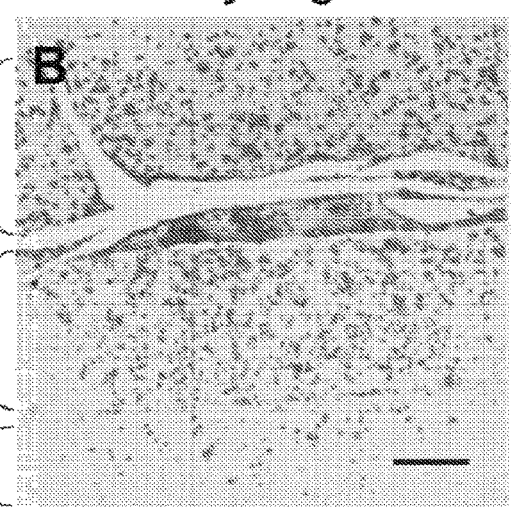
Figure 2C:
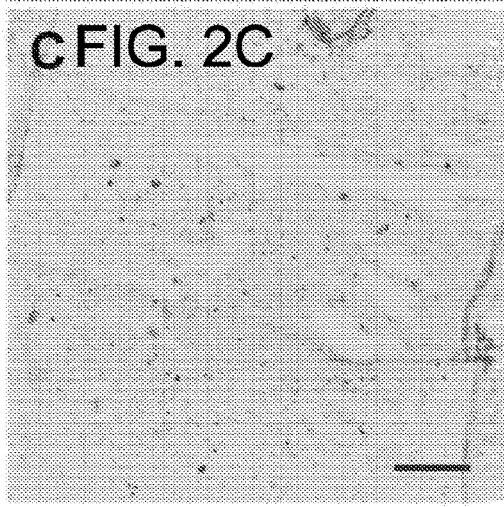
Figure 2D:
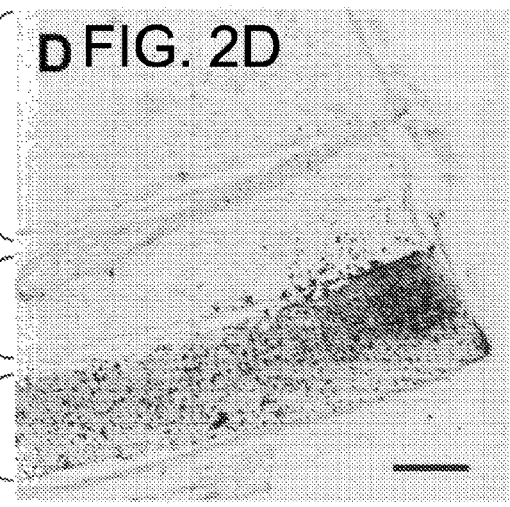
Figure 2E:
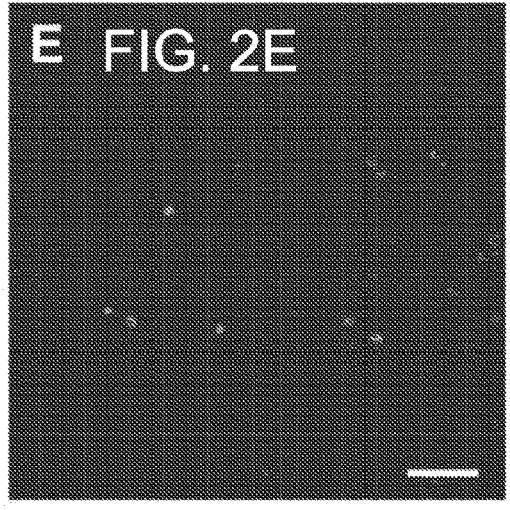
Figure 2F:
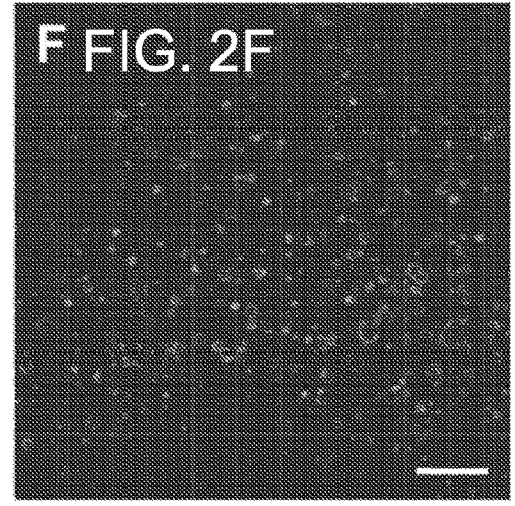

We can control chondrogenesis and endochondral ossification in these hydrogels by controlling the relative composition of polymeric components. We have developed a multiplex assay to screen hydrogel compositions (FIG. 2). We placed populations of chondrocytes at different differentiation stages (proliferative, prehypertrophic, and hypertrophic) in discrete layers of hydrogels and implanted them in dorsal subcutaneous pockets of 8 week old immuno-compromised male mice. Proliferative chondrocytes normally produce high amounts of collagen type II and glycosaminoglycan (GAG) extracellular matrix (ECM) while hypertrophic chondrocytes express high levels of collagen type X and go on to mineralize the ECM. The addition of heparin to the PGH hydrogel (10% w/v) formulation augments maintenance of proliferative chondrocytes in glycosaminoglycan producing state at 8 weeks (FIG. 2A) and inhibits further development of the hypertrophic phenotype (FIGS. 2C and 2E, PGH hydrogel at 6.3% P, 2.1% G, and 1.6% H w/v). However, the G only hydrogel (also 10% w/v) leads to decreased GAG synthesis (FIG. 2B) and accelerated hypertrophy (FIG. 2F) and ECM mineralization (FIG. 2D). The gradient of GAG staining in G constructs (top to bottom) may indicate that a diffusing biofactor from the proliferative layer impacts GAG production in the neighboring layers. The PGH scaffold may have greater retention of this factor due to heparin incorporation leading to a more uniform stain in the hypertrophic zones (Z3, Z4). These cartilaginous constructs grow well in the subcutaneous implant site, a compartment of low vascularity compared to bone sites. They also promote local angiogenesis surrounding the neotissue. This supports the principle that bone production via endochondral ossification through a cartilaginous intermediate is more tolerant of vascular damage than bone grafts and biologics which promote intramembranous ossification (direct bone formation without cartilage).

Figure 3A:
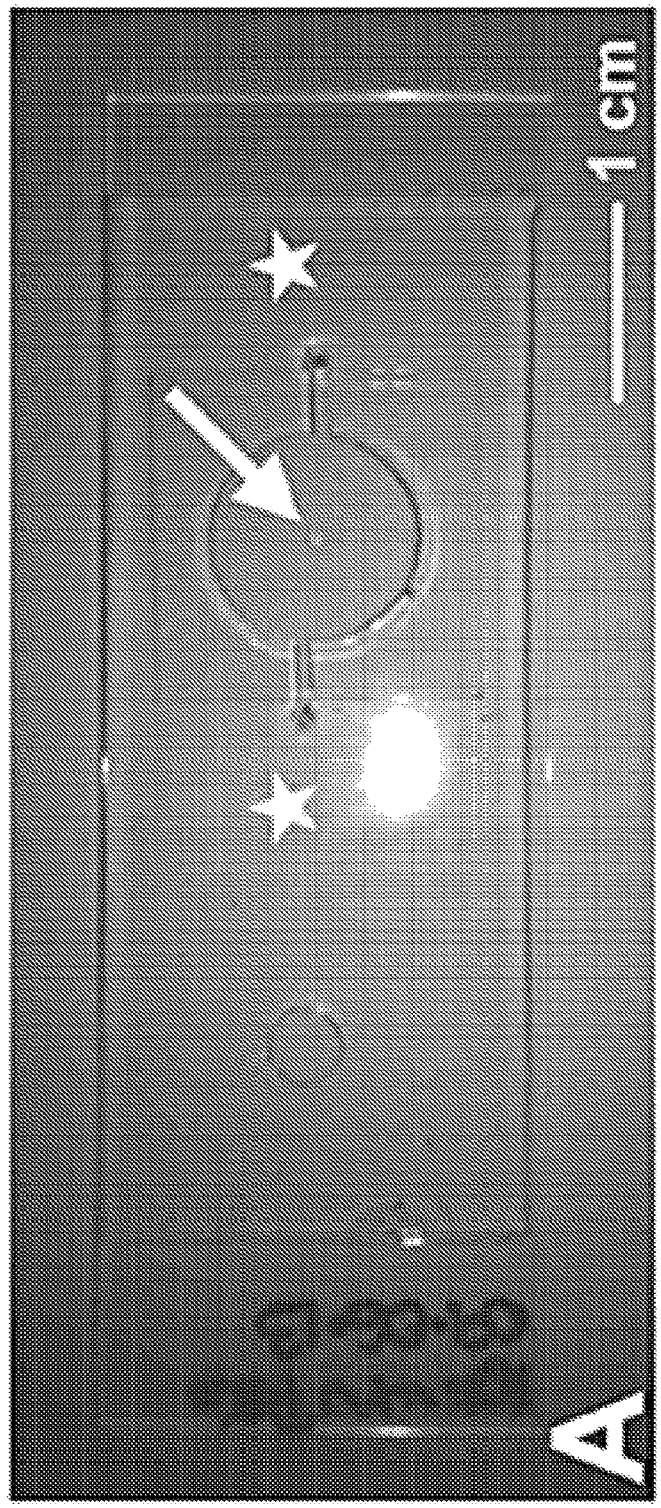
FIGS. 3A-3C illustrate a Permeability Analysis System.
Figure 3B:
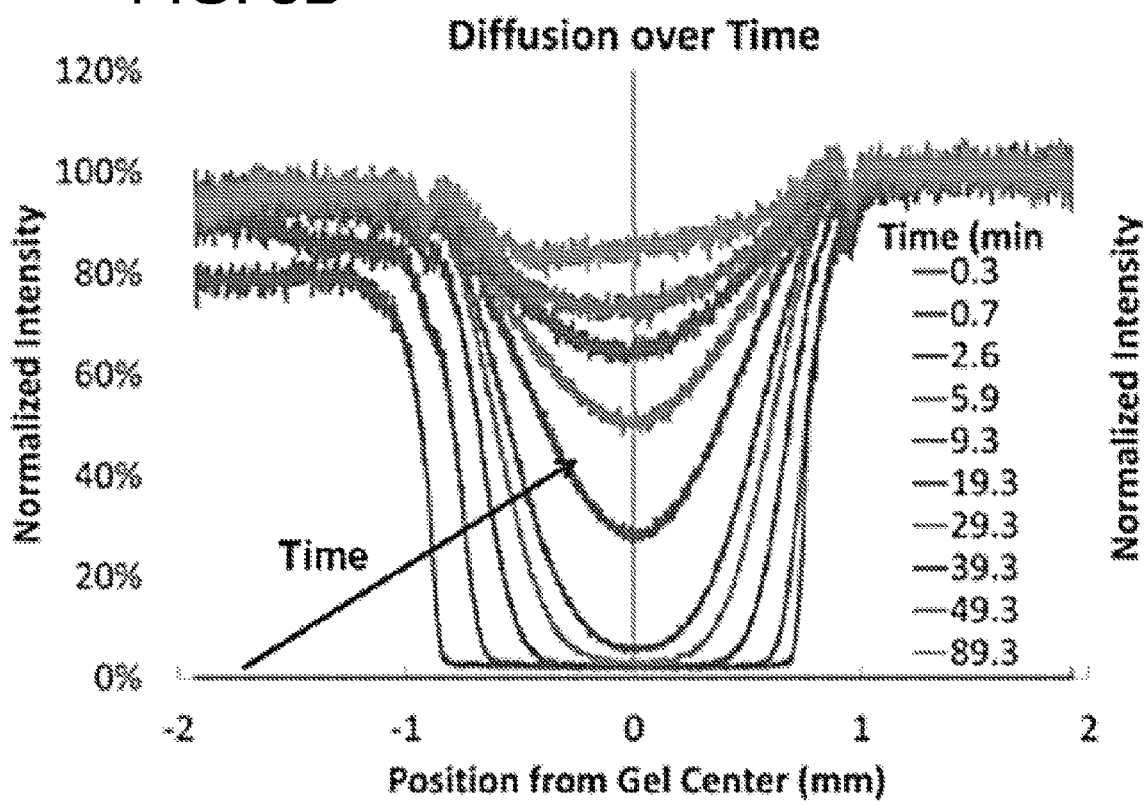
Figure 3C:
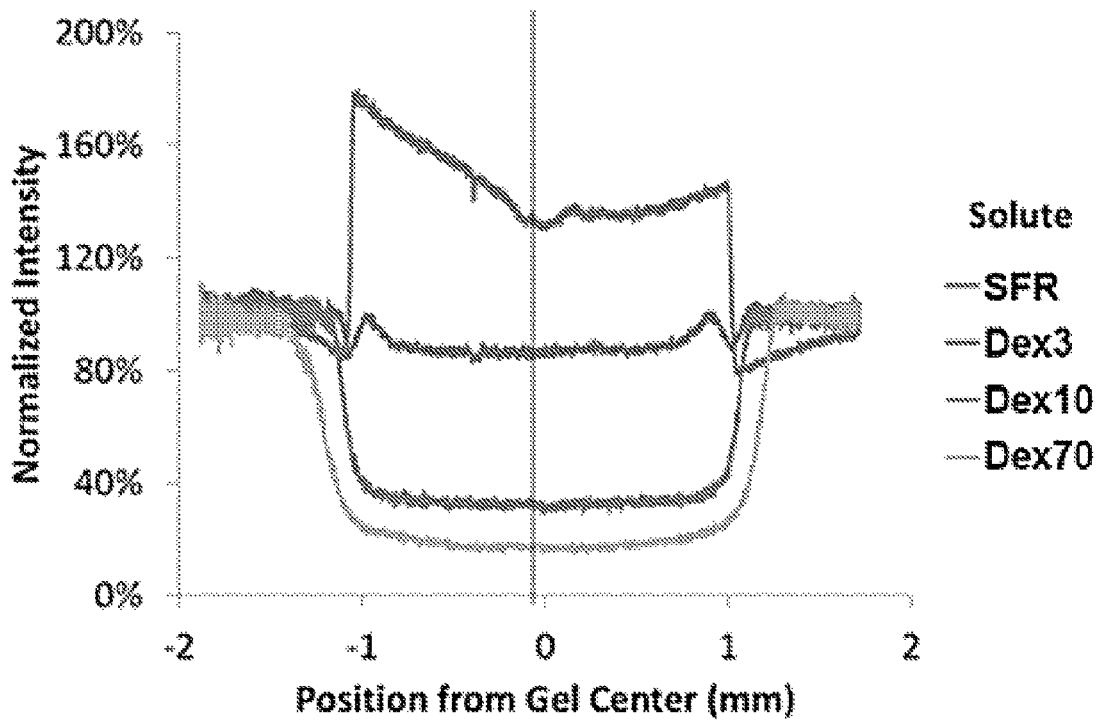

We can control cytokine delivery from our hydrogels. We modulate hydrogel binding of different cytokines and thereby control their diffusion and residence time by adjusting the polymeric components in the hydrogel. We have presented a microfluidic system to characterize the permeability of our hydrogels to cytokines and other biofactors (FIG. 3A). Permeability is a function of the cytokine's mutual diffusion coefficient (transport down a concentration gradient) and its partition coefficient (binding of the hydrogel). We have shown that surrogate molecules of similar molecular weight to TGFβ-3 and IL-10 have lower diffusion and partition coefficients in 10% (w/v) P only hydrogels compared to smaller molecules (FIGS. 3B and 3C). Addition of G and H in the 10% PGH hydrogels further decreases their diffusion coefficients but increases their partition coefficients, indicating greater cytokine retention in the hydrogel and slower release. This mechanism contributes to the enhanced chondrogenic effects of the PGH hydrogel (shown in FIGS. 2A-2F) through increased retention of endogenously secreted and coacervate delivered cytokines and through enhanced intracellular signaling.

Figure 4A:
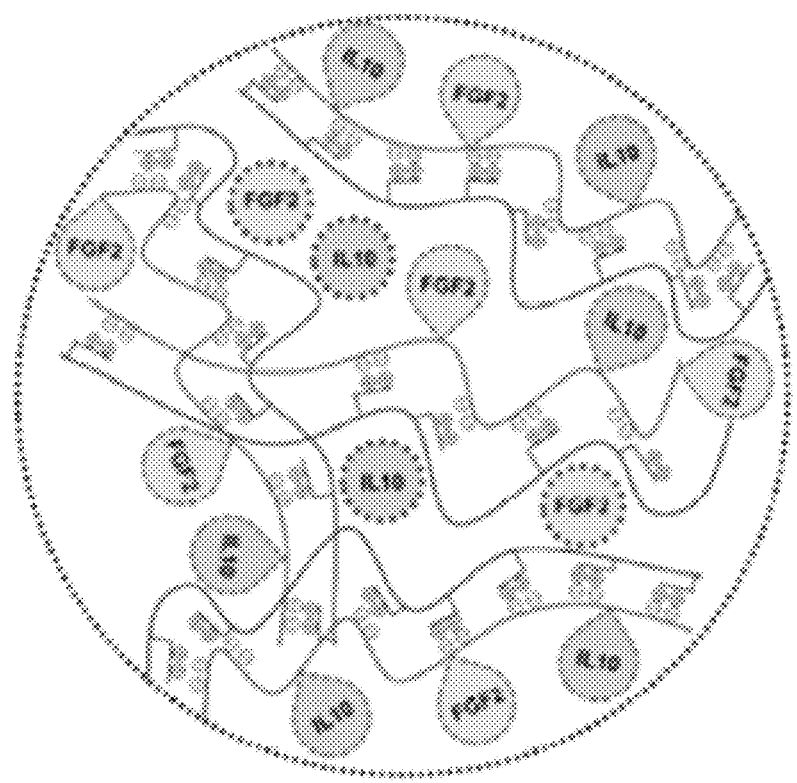
FIGS. 4A and 4B illustrate how drug delivery from the coacervate is controlled by altering concentration, charge, and ratio of the cationic and anionic components.
Figure 4B:
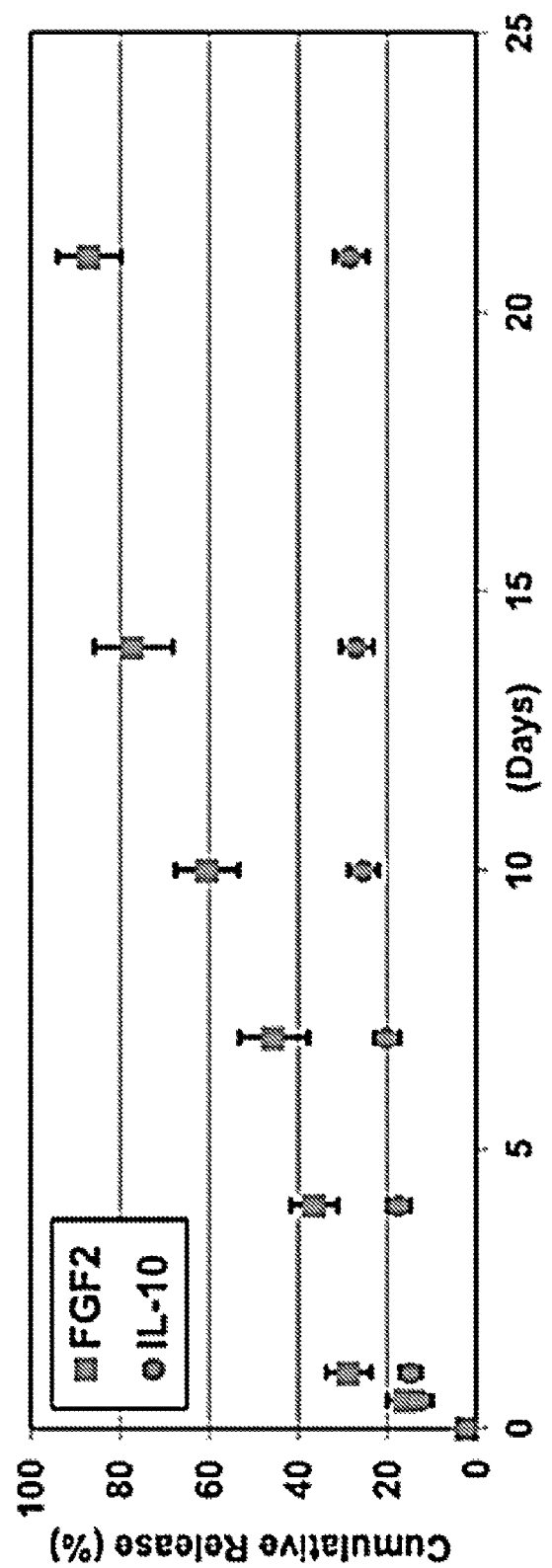

2. Nanoparticles: We have demonstrated prolonged delivery of IL-10 and growth factors in the TGF family from nanoparticles (FIGS. 4, 6 and 7). The nanoparticles are coacervates of heparin with a synthetic cationic polymer, poly(ethylene argininylaspartate diglyceride) (PEAD). The coacervates protect drug bioactivity and prolong their delivery. We have shown that the coacervate mediated sustained delivery is more effective than injection of the respective cytokine in promoting bone healing (FIG. 6) and in modulating host immune response (FIG. 7). The coacervates are biomimetic cytokine delivery systems. They mimic ECM sequestering of growth factors, thereby stabilizing, protecting, and enhancing their activity via coordinated presentation. The coacervates can be formed by the mixing of oppositely charged polyelectrolytes resulting in aggregates of colloidal droplets held together by electrostatic attractive forces and held apart from the surrounding liquid. The coacervate droplets exist in dynamic equilibrium, thus reducing their likelihood of aggregation in response to ionic concentration or temperature changes. We employ intact heparin, the same H component in the fabrication of hydrogels. Heparin can extend the half-lives of many drugs by protection from acid inactivation, heat, and proteolytic modification and degradation. We designed PEAD as a simplistic mimetic of the heparin-binding domain of the fibroblast growth factor receptor, to interact with heparin through polyvalent charge attraction. It neutralizes the inherent negative charge of heparin and induces formation of a coacervate immediately upon mixing. The affinity between PEAD and heparin is high (dissociation constant $K_d$=0.155 nM). Thus, it incorporates high amounts of heparin-binding drugs and controls their release well. PEAD degrades gradually via simple hydrolysis when dissolved in PBS+0.5% FBS, with a 40% drop in the intensity of scattered light after 30 days in solution.

The coacervate confines the drug while the heparin binds the drug. These two effects control drug release. We believe that the release kinetics of drugs bound to PEAD-heparin coacervates can be tailored by: (i) the amount of heparin used in complex formation. More heparin is expected to slow release of the cytokine. (ii) The properties of PEAD such as molecular weight and charge density alter its interaction with heparin which in turn, modifies the release kinetic of the cytokine. These properties can be easily adjusted during polymer synthesis. Other factors that might affect the release of the cytokines include the heparin-binding affinity of the cytokine, coacervate droplet size, pH, temperature, salt concentration, and the ionic strength of the environment. We also expect release to be faster in vivo than in vitro due to presence of enzymes such as esterases and heparinases. Human IL-10 binds to heparin with high affinity ($K_d$=54 nM). Our in vitro experiments have shown a slow release of IL-10 from the coacervate where 30% of the load was released by 3 weeks. 15% of IL-10 remained in residual coacervate as shown by final heparinase digestion (not considering the spontaneous degradation of free IL-10 that was at 1.6% per day on average). Our preliminary in vitro release study suggests that the coacervate can sustain the release of TGF-β3 for approximately 30 days with 60% released by 2 weeks.

Figure 6A:
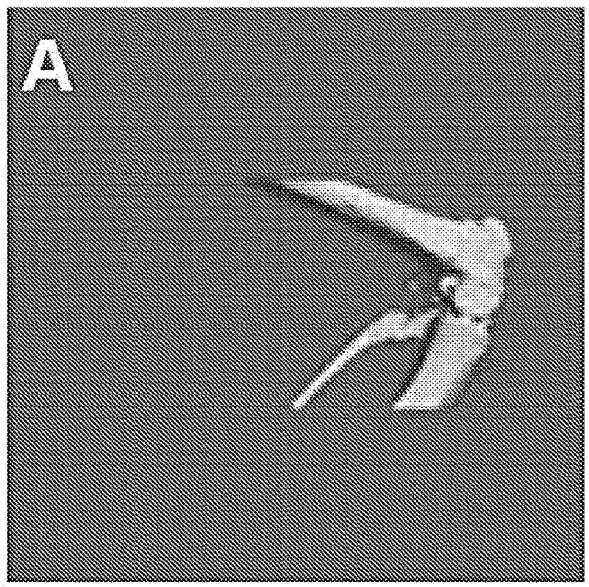
FIGS. 6A-6D illustrate how a stimulation with TGFβ family growth factors induces ectopic bone formation by mouse MSCs, including ρCT images of (FIG. 6A) MSCs (FIG. 6B) BMP2 coacervate, (FIG. 6C) MSCs+BMP2 coacervate in mouse quadriceps at 4 weeks.
Figure 6B:
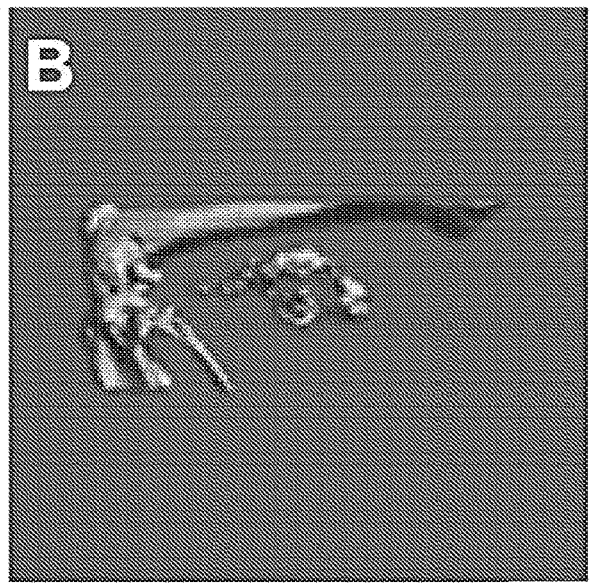
Figure 6C:
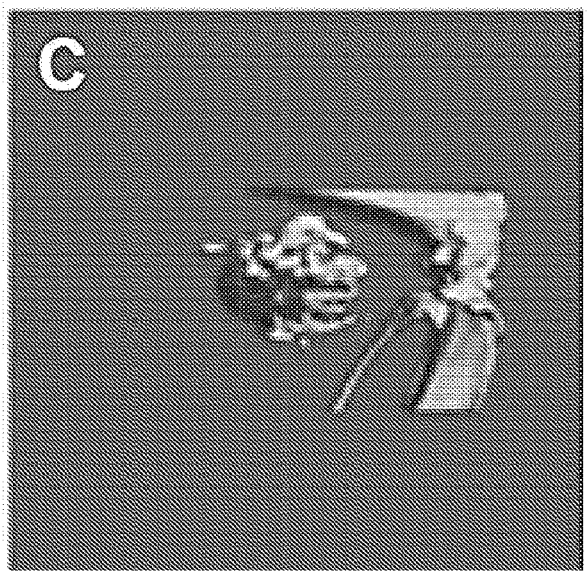
Figure 6D:
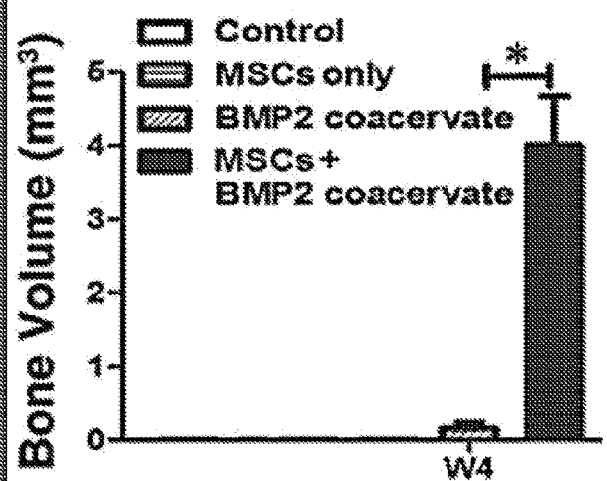

3A. Cytokine, Chondrogenic: We have controlled chondrogenesis and endochondral ossification of MSCs by delivery of growth factors in the TGF family. The chondrogenic cytokine is transforming growth factor beta-3 (TGF-β3), a potent growth factor in the TGF family of growth factors which includes the bone morphogenetic proteins (BMPs). TGFs have pleotropic roles in fracture healing including mitogenic, chemotactic, and differentiation effects on MSCs, chondrocytes, and osteoblasts. TGFs are an important regulator of bone and cartilage formation and healing and of endochondral ossification. TGF-β promotes chondrogenic differentiation of human MSCs (FIGS. 5A-5D). We have also shown that growth factors in the TGF family promote fracture healing and that delivery via the coacervate nanoparticles is more effective than local injection (FIGS. 6A-6C). Thus, much work supports the use of this molecule for driving chondrogenesis in our device. The primary role of TGF-β3 in our device is to induce chondrogenesis of the device delivered MSCs and of the local skeletal progenitor cells in wound.

3B. Cytokine, Immunomodulatory: A proper inflammatory phase is required for fracture repair. Repair is generally described to take place through four phases: (i) hematoma, inflammation, and granulation tissue formation; (ii) cartilaginous callus formation; (iii) bony callus formation; and (iv) callus remodeling into secondary bone. The first phase undergoes acute inflammation with rapid infiltration by neutrophils, which constitute 60% of white blood cells. Resident macrophages are activated, and inflammatory macrophages are recruited in the subsequent phases. However, the phases are not discrete but depend on the previous ones. An unbalanced immune reaction during early healing can delay bone healing and lead to fibrosis. For example, micromotion impairs bone healing in sheep osteotomies by increasing cytotoxic T cell number and delaying revascularization.

We have demonstrated that IL-10 delivery from our coacervate nanoparticles reduces chronic inflammation (phagocyte infiltrate) more effectively than local injection of IL-10 in a mouse model of acute cardiac ischemia (FIGS. 7A-7C). Phagocytes include neutrophils, macrophages, and dendritic cells (among others) which infiltrate the injury site in this order. Circulating neutrophils constitute 60% of leukocytes (white blood cells) and rapidly invade injured tissue during acute inflammation (non-adaptive or innate immunity). They exert a strong anti-bacterial role, crucial in open wounds. Macrophages are differentiated from monocytes (which compose 5% of leukocytes) and play a role in adaptive immunity. They migrate to sites of hypoxia and cytokine expression and release several factors that regulate bone regeneration, e.g., TNF-α. Macrophages/monocytes invade and accumulate in tissues at a later stage in the inflammatory process than neutrophils, but are recruited by cytokines expressed by invading neutrophils and resident macrophages. Thus, neutrophils may have a strong role in potentiating the bone healing response while macrophages/monocytes a potent role in regulating healing. NSAID and steroidal inhibition of fracture healing may in part be explained by altered neutrophil recruitment of macrophages. Dendritic cells are antigen presenting cells that regulate T cell activation. T-cells are a subset of lymphocytes (which constitute approximately 30% of leukocytes) and have roles in both innate and adaptive immunity via targeted cell lysis and cytokine secretion. They also accumulate at a later stage of inflammation than neutrophils. Interestingly, deficiency of the more rare γ/δ T cell enhances tibial fracture regeneration rate, stability, and mechanical strength in a genetically engineered mouse model, likely via the deficiency-induced altered cytokine environment.

Whether repair follows a proinflammatory course leading to fibrosis and scarring, or a constructive remodeling course resulting in deposition and organization of site appropriate tissue, depends to a significant degree on the phenotype of the macrophage infiltrate. Macrophages display a spectrum of differentiation with the extremes bounded by M1 (classically activated) and M2 (alternately activated) phenotypes. M2 macrophages suppress a Th1-like response and promote Th2-like response. The Th1 response inhibits osteogenesis and fracture healing through cytokines such as interferon gamma (IFN-γ). This phenotype classification (M1 vs. M2) is defined on the basis of their gene expression patterns, production of effector molecules, and biologic function, the basis of assays characterizing populations in tissues. These phenotypes are driven in vitro via suprastimulation with cytokines, the M1 with interferon gamma and lipopolysaccharide or endotoxin and the M2 with interleukin-4. Though this models the extremes of the spectrum of macrophage phenotype, it provides a basis to understand the range of proinflammatory effects of M1-like effector cells and of anti-inflammatory/regulatory M2-like effector cells. The causes and the effects of macrophage polarization toward a given phenotype have been largely studied in the context of the host response to pathogens and their role in cancer biology. Only recently have studies begun to investigate macrophages and their polarization in fracture healing, and the M2-like phenotype has been shown to promote MSC differentiation and fracture healing.

IL-10 is a cytokine with pleiotropic anti-inflammatory and immunoregulatory effects. It is secreted by many cells including monocytes, macrophages, Th2 cells and Tregs, all of which are present in fractures. It is known for its function in limiting an inflammation response, such as synthesis of pro-inflammatory cytokines (e.g. IL1-β, IL-6, and TNF-α) by antigen-presenting cells and lymphocytes. We use IL-10 in our devices for two reasons: (i) IL-10 attenuates acute inflammation which impairs bone neogenesis and drives aberrant fibrosis. It tunes down expression of proinflammatory cytokines and triggers a macrophage phenotypic change from proinflammatory M1 to anti-inflammatory M2; (ii) IL-10 favors large cartilaginous callus formation at the bone fracture site which is more tolerant of vascular damage than direct bone formation. IL-10 allows chondrogenic differentiation of MSCs, which is inhibited by IL-1β and TNF-α, cytokines up-regulated following bone injury. Local injection of IL-10 results in a large, unmineralized callus in a murine tibial fracture model. We employ local delivery because (i) systemic delivery may impact healing of other injuries in wounded personnel and because (ii) high doses are not well tolerated with systemic delivery.

TGFs also exert immunomodulatory effects and thus the TGFβ-3 in our device exerts a secondary role. TGFs are secreted by platelets, inflammatory cells, chondrocyte and osteoblasts in the fracture. They are chemotactic for macrophages into the fracture and also promote an M2-like macrophage phenotype. They likely play a significant role in the beneficial effects of platelet rich plasma on fracture healing. Based on our preliminary data and prior studies, we expect that IL-10 and TGF-β3 delivery will counteract the effects of Th1-like inflammatory cytokines (TNF-α, IL-1, IL-6) initially released from the hematoma and granulation tissue and promote a more Th2-like response. We expect IL-10 and TGF-β3 delivery to promote alternate activation of macrophages to the M2 phenotype and non-fibrotic tissue regeneration.

Figure 8B:
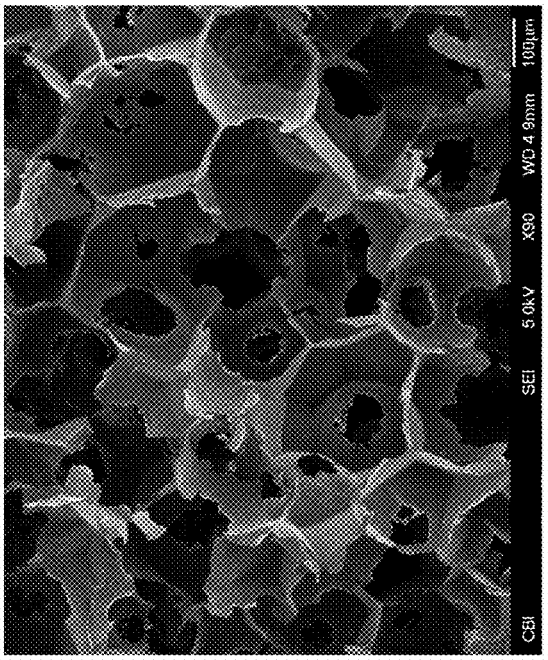
FIGS. 8A-8C illustrate how porogens, freeze-casting and thermal crosslinking of the composite hydrogels is used to manufacture solid scaffolds with controlled porosity.
Figure 8A:
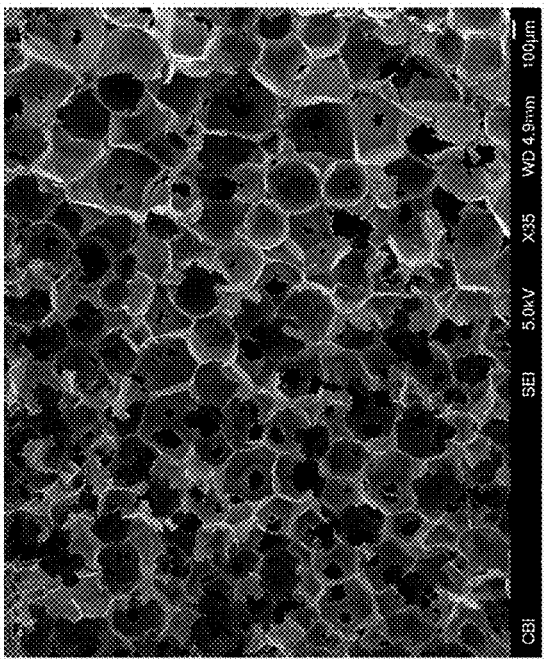
Figure 8C:
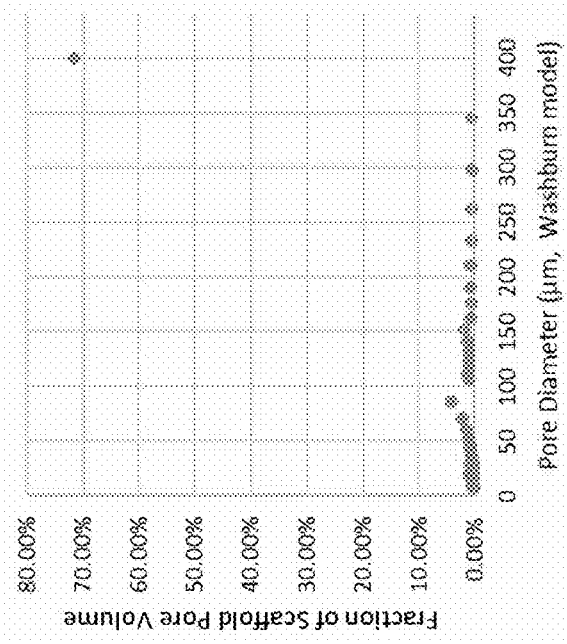
Figure 9A:
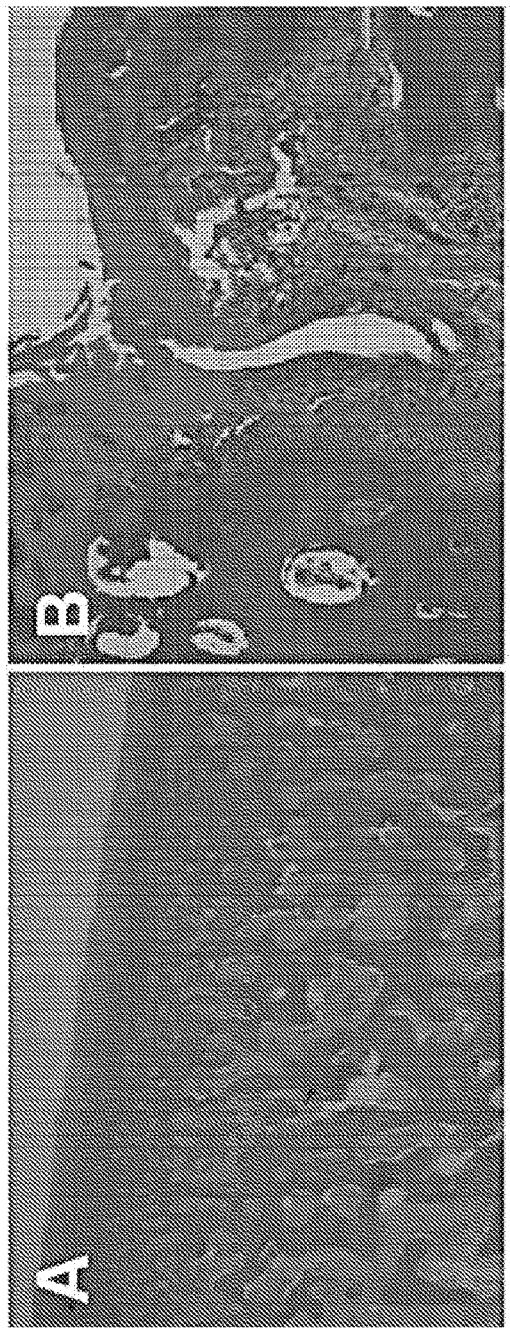
FIGS. 9A-9D illustrate how acellular PG hydrogel promotes healing of temporomandibular joint condylar fibrocartilage under unrestricted chewing in osteochondral defects made in skeletally mature goats.
Figure 9B:
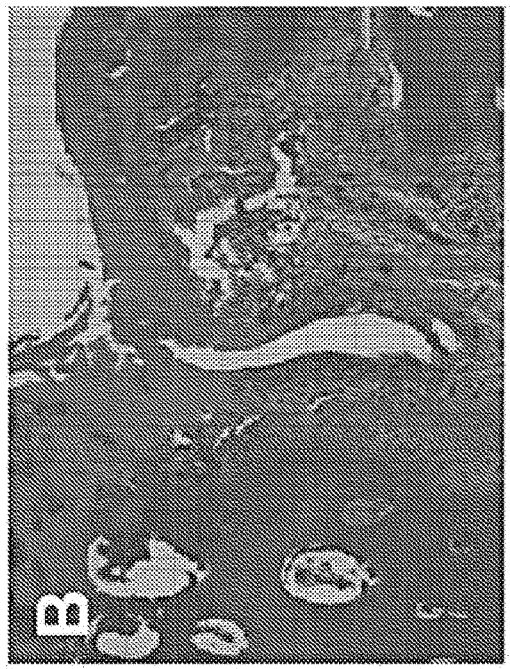
Figure 9C:
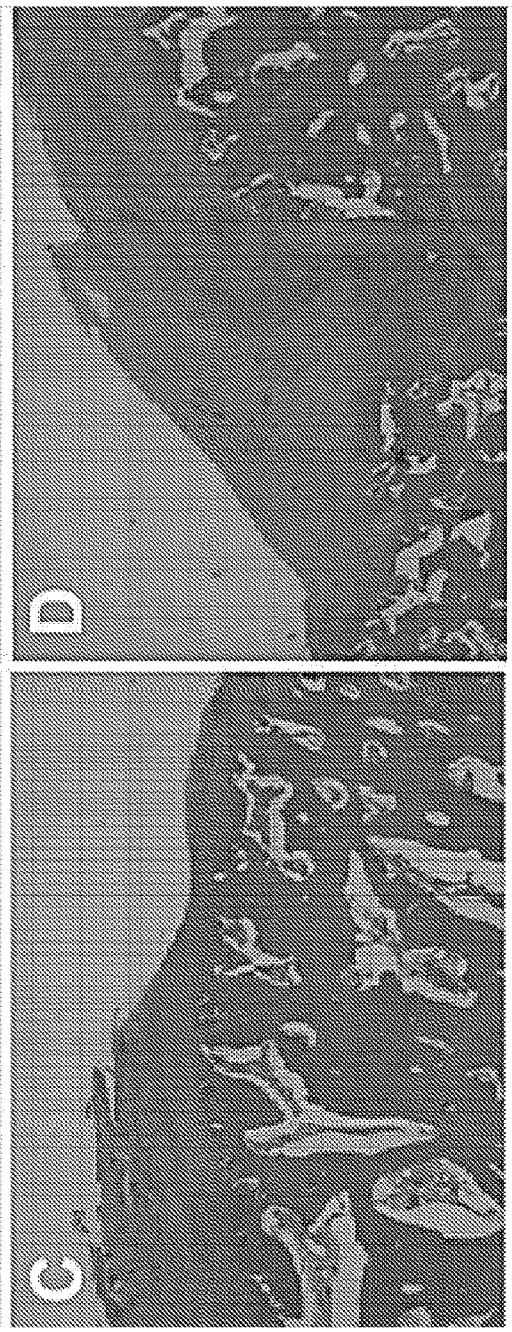
Figure 9D:
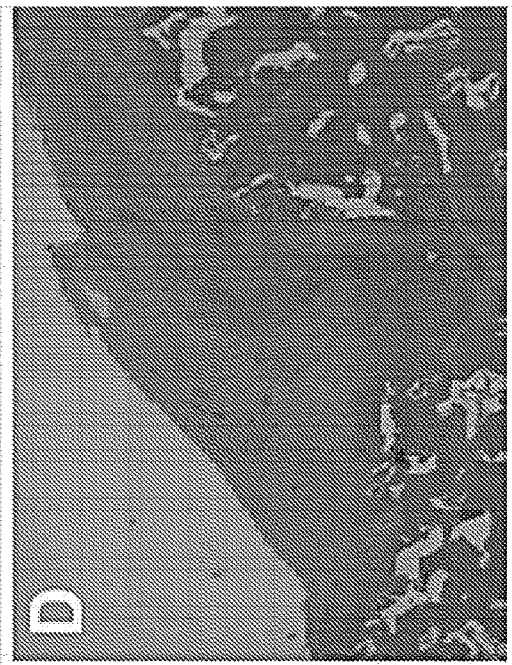

4. Scaffold: We have manufactured porous scaffolds using the hydrogel polymers (FIGS. 8A-8C). These scaffolds provide structural integrity to the hydrogel in large defects. They are manufactured using porogen casting, lyophilization and thermal crosslinking as published by others.

5. MSCs: Prior studies support our approach to regenerate bone through endochondral ossification by MSCs. MSCs are a promising cell type for bone regeneration in our device: (i) they are an ample cell source that can differentiate into cartilage and bone cells; (ii) they naturally undergo hypertrophy in long-term chondrogenic cultures; and (iii) they can generate bone via endochondral ossification in vivo. MSC-derived chondrocyte-seeded scaffolds produce more bone and marrow-like tissue compared to undifferentiated MSC-seeded or MSC-derived osteoblast-seeded scaffolds implanted in subcutaneous pockets in mice. Using the same model, hypertrophic cartilage templates (made from human MSCs) form cortical-like bone on the exterior surface and a marrow-like cavity containing hematopoietic stem cells derived from the mouse cells, and an interior network of trabecular bone containing the human donor cells. These constructs were extensively vascularized. Thus, these studies also support the principle that bone production through a cartilaginous intermediate may be more tolerant of the vascular damage in extremity wounds than bone grafts and biologics which promote intramembranous ossification. Recently conceptual proof was presented of generating bones with human anatomical structure (distal phalanx)

from MSC-derived cartilaginous templates. In this study, hydrogels were seeded with porcine MSCs and precultured in vitro to induce chondrogenesis before implantation in subcutaneous pockets in mice. We have also demonstrated the ability to manipulate MSC differentiation in vitro and in vivo as described above (see 3A. Cytokine) and in published work with subcutaneous implants in mice. However, none of these prior studies have attempted to form bone in an orthotopic site as we will do in this planned research. Thus, our work will push MSC-based endochondral bone regeneration far forward to clinical application.

In addition to their role as skeletal progenitor cells, MSCs exert immunomodulatory effects. MSCs have the potential of improving fracture healing through a temporally and spatially controlled secretion of factors that modulate the immune response. Levels of pro-inflammatory cytokines subside during the chondrogenic phase of fracture healing, in part under MSC regulation of macrophage and other immune cell activity. Macrophages in turn activate MSCs to secrete prostaglandin E2 (PGE2), which converts these to the M2 phenotype that secretes IL-10. MSCs themselves can produce high levels of IL-10 when stimulated, which suppresses T cell proliferation and TH17 differentiation. In turn, MSCs are stimulated to release several factors such as TGF-βs, vascular endothelial growth factor (VEGF), platelet-derived growth factor (PDGF), and fibroblast growth factor (FGF). TGF-β, PGE2, and VEGF are important regulators of endochondral ossification and osteogenesis. Thus, MSC delivery is favorable because they have been shown to modulate the phases of inflammation and support fracture healing more effectively than direct delivery of respective antagonists.

6. Animal model: We will employ Yorkshire swine to evaluate bone regeneration in two injury models over time. We use this large animal because it is an established preclinical model for bone defect healing with similar bone growth rates to humans, and because we have used it to develop therapies for other extremity tissues, including vascularized composite muscle flap transplants and immunomodulation for transplants. The swine immune system is similar to humans and swine are the most used model for transplantation immunology. We have used swine to test immunomodulative therapies and to study the human peripheral blood mononuclear cell (PBMC) response to genetically engineered swine under development as xenotransplant sources. In addition, other swine breeds have already been used to study the immune compartment in segmental tibial defects. The Yorkshire swine have also been used to test repair of comminuted fractures. We use an open wound segmental bone defect model rather than common closed fracture models to more closely simulate the degree of injury in combat personnel. We have previously tested the Implantable Hydrogel Infused Scaffold without cytokines or MSCs (only components 1 and 4) in a goat model of osteochondral regeneration (FIGS. 9A-9D).

Hypotheses

Based on these preliminary data and scientific background, our global hypothesis is that controlled delivery of the immunomodulatory and chondrogenic cytokines IL-10 and TGFβ-3 will promote bone regeneration and decrease fibrosis in both comminuted fractures and critically sized segmental bone defects compared to no cytokine controls and untreated controls. We hypothesize that TGFβ-3 loaded devices will promote chondrogenesis by the delivered MSCs and by local skeletal progenitors in the experimental wounds, with the higher TGFβ-3 dose promoting more chondrogenesis and ultimately more rapid bone regeneration. We hypothesize that IL-10 and TGFβ-3 loaded devices will promote alternate activation of macrophages to the M2-like phenotype and shift the immune response in the wound from a Th1-like to a Th2-like profile, with the low Il-10 and high TGFβ-3 dose combination maximally speeding regeneration. We hypothesize that the hydrogel will promote bone regeneration in both models via formation of a larger cartilaginous callus-like tissue than no hydrogel controls. We hypothesize that the MSCs will promote regeneration in the critical defect model by both contributing to osteochondral tissue formation and by modulating the immune response to promote an M2 macrophage phenotype and a shift to Th2-like cytokine levels. As a corollary, we hypothesize that the osteochondral tissue formation by MSCs will require local TGFβ-3 delivery. Furthermore, we hypothesize that cytokine and hydrogel delivery in the implantable device will promote more localized bone formation versus the highly used biologic Infuse. We test these hypotheses in the following specific aims.

Research Strategy

We will use adult female Yorkshire swine weighing 80-90 kg to evaluate bone regeneration in the two injury models over time. We will employ a 3.0 cm open transverse segmental defect in the distal fibula metaphysis, implant our hydrogel infused scaffold device, plate, and close the wound. We use an open wound segmental bone defect model rather than common closed fracture models to more closely simulate the degree of injury in combat personnel. We will simulate a comminuted fracture that is similar to previous studies in these swine by chipping the cut bone of the same 3 cm defect, filling the defect with the chipped bone, plating and closing the wound. We will then inject the hydrogel device. We will implant the devices bilaterally to provide for the assessment of two groups per pig and more efficient use of animal resources. To minimize potential for plating hardware failure, we preserve the tibia and use a hindlimb defect because these limbs are less loaded than the forelimbs. We will interleave the experimental replicates of each treatment group evenly throughout the 3 years of the study to catch potential complications early and execute experimental adjustments.

We compare the efficacy of our Injectable Hydrogel devices against comminuted fractures that are stabilized with plate fixation. We compare our implantable Hydrogel Infused Scaffold devices against untreated critical sized defects and defects treated with INFUSE Bone Graft, the most clinically used biological for bone regeneration. INFUSE is composed of recombinant human BMP-2 solution (1.5 mg/ml) soaked into a collagenous sponge carrier. It is approved for trauma treatment of acute, open fractures of the tibial diaphysis and for spinal fusion. Some studies indicate the high BMP-2 dose may be immunogenic and induce swelling. We expect that our devices will retain the cytokines for a much longer period as they employ controlled delivery via both the coacervate nanoparticles and controlled hydrogel permeability. As such, we employ cytokine loading levels that are two orders of magnitude less (1/150) than that of INFUSE. Contraindications for INFUSE include inadequate neurovascular status (vascular insufficiency, either damaged vessels or poor regulation of tone) and compartment syndrome (high pressure within injury), which are common complications in compromised extremity wounds. Our device is designed to be employed in such wounds, but is not so limited.

Study Design
i) Injectable Device for Comminuted Fractures

Our objective is to assess the ability of an injectable device to regenerate bone in comminuted fractures, prevent fibrous tissue ingrowth, and rapidly initiate regeneration as assessed in the swine model. We will assess the immediate immunomodulatory effects of the device with blood and lymph draws over the first month post-surgery. We will assess the immunomodulatory effects of the device and the potential for endochondral ossification in the repair site tissue using terminal assays at 1 month post-surgery in 3 experimental replicates per treatment group. We will assess the functional regeneration using terminal assays at 5 months post-surgery in 6 experimental replicates per treatment group. We will test our hypotheses in the following groups:

Groups and Sample Size:
   Group A1) Empty control, no injected device
   Group A2) High dose cytokines, Hydrogel with 10 µg/ml each of TGFβ-3 and IL-10 Group
   A3) Low dose cytokines, Hydrogel with 1 µg/ml each of TGFβ-3 and IL-10
   Group A4) IL-10 only, Hydrogel with no TGFβ-3 and 1 µg/ml of IL-10

We estimate placing at least 5 ml of the Injectable Hydrogel into the comminuted fracture which yields a loading of 50 µg each TGFβ-3 and IL-10 for the high dose cytokines, and 5 µg each of TGFβ-3 and IL-10 for the low dose. Gene expression studies will require n=3 samples per group. Histomorphometry will be performed on the same samples as biomechanics, requiring n=6 per group. Thus, with a total of n=9 scaffolds per group, we will require 36 hydrogel injections for this objective (4 groups×9 hydrogels/group).

We will compare our results to the no scaffold control. Furthermore, we will assess for the dose response required for healing. We expect that lower doses used in our device relative to the currently available biologic products (e.g. INFUSE) will be effective. We will also test scaffold with just IL-10 to verify the positive impact of the immunomodulatory agent. We expect that the lower dose of IL-10 will be more effective than the higher. High doses have been shown to be deleterious in preventing graft rejection. Il-10 also down-regulates cyclooxygenase-2 and thereby PGE2, an important molecule in osteogenesis. We expect that the high dose of TGFβ-3 will be more chondrogenic, but that prolonged delivery will inhibit maturation of the tissue and endochondral ossification.

ii) Implantable Device for Non-Union Fractures

When the surgeon has time to prepare and repair a non-union injury, this provides ample time to harvest MSCs and deliver them with an implantable device. The MSCs and immunomodulatory cytokine loaded in the device make the wound environment more conducive to regeneration while the hydrogel protects from fibrosis. The hydrogel and the chondrogenic cytokine (TGFβ-3) drive cartilage formation by the MSCs and local skeletal progenitor cells leading to endochondral ossification, which produces bone in wounds with compromised vascularity. Thus, the device mitigates hypoxia and non-union by local immunomodulation via the cytokines and MSCs, by shielding the wound site and MSCs, and by regenerating bone through cartilaginous intermediate. Our objective is to assess the ability of this device to promote bone formation and minimize non-union when conventional autografts and bone fillers are contraindicated. We will perform the same assessments described for the comminuted fractures. We will use the same time-points and assays as above (see: i) Injectable device) and the following groups:

Groups and Sample Size:
   Group B1) Empty control, no implanted device negative control
   Group B2) Clinical standard, INFUSE, collagen sponge with BMP-2
   Group B3) High dose cytokines+MSCs, 10 µg/ml each of TGFβ-3 and IL-10 and 30×106 MSCs/ml
   Group B4) High dose cytokines−MSCs, 10 µg/ml each of TGFβ-3 and IL-10
   Group B5) Low dose cytokines+MSCs, 1 µg/ml each of TGFβ-3 and IL-10 and 30×106 MSCs/ml
   Group B6) Low dose cytokines−MSCs, 1 µg/ml each of TGFβ-3 and IL-10
   Group B7) Hydrogel infused scaffold control, No MSCs, no TGFβ-3, and no IL-10

We estimate placing a volume of Implantable Hydrogel Infused Scaffold per defect of at least 20 ml. This corresponds to a loading of 200 µg each TGFβ-3 and IL-10 for the high dose cytokines, and 20 µg each of TGFβ-3 and IL-10 for the low dose. Like in the comminuted fracture model, we will implant the scaffolds bilaterally in the hind legs of pigs. The same assessments will be performed; thus, we will need again a total of n=9 scaffolds per group. This will require 63 scaffolds for this objective (7 groups×9 scaffolds/group). In total, 50 pigs are required (36+63 scaffolds divided by 2 scaffolds/pig).

We will compare our results to the no scaffold control and to the clinical standard for biologics (INFUSE). Furthermore, we will assess the dose response required for healing with and without MSCs. We expect that lower doses than those used in currently available commercial devices will yield effective results. We will also compare results to a bare scaffold control.

III) Msc Preparation:

We will draw bone marrow aspirates from the iliac crest of the swine 3 weeks before surgery as we have published. We will isolate autologous bone marrow cells using centrifugation over Ficoll-Paque PLUS density gradient media and tissue culture plastic adherence as we have published. This yields a heterogeneous population enriched for CD29 and CD44 antigen (markers of MSCs) and low in CD34 and CD34 (endothelial and hematopoietic markers). We will expand the MSCs in α-MEM medium containing 10% fetal calf serum and 2 ng/ml fibroblast growth factor 2 (FGF-2) and antibiotics.

iv) Surical Procedure:

Anesthesia will be induced with Acepromazine (0.1-0.5 mg/kg) and maintained on Isoflurane (1-5%). The surgical approach will involve a skin incision just lateral to the distal fibula, with soft tissue dissection preserving the local innervation and vasculature (though minimal in this portion of the anatomy). For the critical sized defect, a bone saw will be used to remove a 3 cm long section that includes the diaphysis and first third of the metaphysis. The tibia will be preserved. Gauze will be used to absorb blood and promote clotting. After 10 minutes, the implantable Hydrogel Infused Scaffold device will be placed in the defect site and bone plates and screws will be used to further fix the fracture site. The muscle, fascia, and skin will be closed with suture. For the comminuted fracture, a similar surgical procedure will be used to excise a 3 cm section of the fibula. Then this bone will be chipped with a vice-like crusher and packed back into the defect site. The site will be closed as above and then the Injectable Hydrogel device will be injected into the site.

Following the surgical procedure and cessation of inhalation anesthesia, each animal will be continually monitored for 24 hours, recording the following parameters every 3 hours: pulse rate, strength of pulse, capillary refill time, respiratory rate and ability to maintain an open airway, urinary output, and defecation. Buprenorphine (0.005-0.01 mg/kg IM or IV, q12 h), will be administered for 5 days for pain, and then as needed. The pigs will receive Cephalexin (35 mg/kg q12) for 5 days as a prophylactic antibiotic. At the predetermined time of sacrifice, pigs will be sedated with Acepromazine (0.1-0.5 mg/kg BW SC) masked with 5% Isoflurane for 5 minutes and then given Pentobarbital Sodium IV (390 mg/4.5 kg BW). The hind limbs will be removed and dissected for testing.

Methods for Aim 1: Manufacture the Bone Regeneration Devices

Hydrogel Fabrication: We will methacrylate, purify, and characterized the polymers for hydrogel fabrication as we have previously demonstrated. For PEG (Mr=3500-4500), we have used the method of Lin-Gibson et al. 2004 to generate methacrylated PEG. For gelatin (Type B, Mr=40,000-50,000) and sodium heparin (intestinal mucosa, Mr=15,000), we have used the methods of Nichol et al. 2010 and Schuurman et al. 2013 to generate methacrylated G and H, respectively. We will thiol- modify the G (for use in the injectable hydrogel device only) using the methods of the Prestwich group. We will characterize our methacrylated and thiol-modified polymers as has been done previously. We will form hydrogel blends by dissolving polymers in PBS, mixing at the indicated mass ratios (6.3% P, 2.1% G, 1.6% H, w/v). For the implantable hydrogel infused device, the photocrosslinking initiator is added during the mixing step of the hydrogel precursor (FIG. 1). We will use 0.005% w/v LAP initiator (lithium phenyl-2,4,6-trimethylbenzoyl phosphinate) and photopolymerizing with 2.5 J/cm$^2$/mm UV-A. We have synthesized LAP. For the injectable hydrogel device, the thiol-modified gelatin is added to the methacrylated PEG and H hydrogel precursor during the mixing step. The hydrogel then undergoes a thiol-ene crosslinking reaction over several minutes providing sufficient working time for injection.

Coacervate Fabrication: We will manufacture the coacervates as we have published, using the same composition and cytokine loading (TGFβ-3 and IL-10) as in FIGS. 7A-7C. These are then mixed into the hydrogel precursors before crosslinking.

Scaffold Fabrication: We will fabricate the porous scaffold from the hydrogel described above, as illustrated in FIGS. 8A-8C.

Methods for Aim 2: Assess the Immunomodulatory Effect and Potential for Endochondral Ossification at 1 Month Post-Surgery.

Non-Destructive Assays of Immunomodulatory Effects and Bone Regeneration:
1. X-rays performed at 2 week intervals throughout the study.
2. Immune cell characterization from blood and draining lymph nodes on days 0, 1, 3, 7, 14, 30.
3. Cytokine profiling in blood serum on days 0, 1, 3, 7, 14, 30.

X-ray: We will walk the swine in front of x-ray plates and image. We will score the films for bone formation and fusion, assigning separate ordinal scores for bone formation, fusion and modeling.

Immune cell characterization: We will isolate PBMCs from the blood and inguinal lymph node and characterize them. We will draw day 0 samples before surgery as controls for reference. For example, we will draw blood from the vena cephalica antebrachii with heparin as a clotting inhibitor and then isolate the PBMCs by centrifugation over Ficoll-Paque PLUS. We will wash the cells in PBS, immunostain, fix, and suspend them in flow cytometry buffer for phenotyping on a FACSAria II. We will identify leukocytes as CD45+, with monocytes as CD14+, B cells as CD21+, and T cells as CD5+, and their sub-types T-killer with CD8+ and T-helper (Th) with CD4+. We will detect specific Th (Th1, Th17 vs. Th2) and macrophage phenotypes (M1 vs M2) using intracellular staining for cytokine levels and flow cytometry. For example, we will use T-bet/STAT4 to identify Th1 cells, GATA3/STAT6 for Th2, and RORgamat/STAT3 for Th-17. We will use appropriate antibody isotype and negative controls. We will also isolate T cells and stimulate them over 3-4 days in vitro to evaluate their cytokine production in the supernatant by Luminex.

Cytokine profiling: We will apply the serum from the Ficoll-Paque procedure to the Luminex assay platform (R&D Systems) with the PCYTMAG-23K|MILLIPLEX MAP Porcine Cytokine and Chemokine Magnetic Bead Panel (EMD Millipore) to identify whether the systemic cytokine response is fibrotic (i.e. Th1 including IFN-α, TNF-α) versus reparative (e.g. Th2, including IL-10, IL-13). These time points have been used by others to investigate immunological responses during bone formation in pigs.

Terminal Assays for Immunomodulatory Effects at 1 Month:

This time-point was selected because it takes a few weeks to establish an (indirect) immunological response to the engrafted tissue. In addition, our previous experience shows that full commitment of MSCs down a chondrogenic or osteogenic lineage can be detected by this time.
1. Transcriptome analysis of tissue via Affymetrix gene array followed by RT-qPCR analysis.
2. Immunohistochemistry to identify cellular mileu.

Transcriptome: We will execute a comprehensive analysis of growth factor, cytokine, and immune cell gene expression markers using a gene chip array and associated software. Samples will be processed following the manufacturer's recommended protocol for tissue lysis, RNA purification, and amplification and labeling. To precisely quantify the expression difference of genes identified in the array, RT-qPCR will be performed using PowerUp SYBER Green Master Mix (ThermoFisher Scientific) and primers from Affymetrix.

Immunohistochemistry: We will process the tissues for paraffin embedding, serial sectioning, and staining. Along with markers described for flow cytometry, we will use CD68+ to detect macrophages and discriminate between phenotypes with CD206+ (M2-like phenotype) and CCR7+ (M1-like phenotype).

Terminal Assays for Endochondral Ossification Potential at 1 Month:

We will use the same transcriptome and immunohistochemical assays to study the regenerate tissue differentiation, namely chondrogenic, osteogenic, and fibrous tissue markers. The gene chip array contains a panel of gene expression markers for cartilage, bone, and fibrous tissue, including associated remodeling enzymes. We also have primers available in house for RT-qPCR of these markers. We have demonstrated biochemical and immunohistochemical detection of skeletal tissue type and degree of chondrocyte maturation.

Methods for Aim 3: Assess the Functional Bone Healing Response after 5 Months Post-Surgery Terminal Assays for Functional Regeneration at 5 Months:

1. Micro-computed tomography (μCT) imaging to quantify bone volume and ultrastructure.
2. Mechanical 4-point bending (non-destructive) for bone strength.
3. Histological assays for bone, cartilage and fibrous tissue.
4. Histological assays for revascularization and reinnervation.
5. Histological assays for immunological response in the mature engrafted tissue.

μCT: To evaluate overall construct growth, endochondral ossification and fracture healing, we will use mechanical and μCT analysis followed by histochemical staining of serial sections. We will perform μCT scans on a FIDEX multimodal system (Animage) before mechanical testing and evaluate the structure of mineralized cartilage and bone (e.g. volume, surface area, connectivity).

Mechanical: We will evaluate bone bridging quality in the fibular defects using four-point bending mechanical tests, and compare results to empty controls and intact fibulas (as positive controls). We will perform testing on an Instron 5566 machine immediately after sacrifice and CT imaging, but before fixation. To exclude its contribution to the bone strength, the tibia will be cut transversally in two areas, 9 cm apart, from each side of the defect. The test will be set at a start point of 0.1N load, loading speed of 5 mm/min and a stop point of 0.85 mm flexural extension (experimentally determined to prevent fracture of samples designated for subsequent histological analysis). The flexure stiffness will be calculated from the force required to bend the specimen to 0.85 mm.

Histological: After mechanical testing, we will process the tissue for paraffin embedding, sectioning, and biochemical and histochemical staining. To evaluate global tissue architecture and MSC osteochondral differentiation, we will use biochemical staining to identify cartilage vs. bone, cartilage vs. collagenous fibrous tissue, and fibrous tissue vs. bone. We will use Safranin O/Fast Green/Hematoxylin staining for cartilage, Eosin/Hematoxylin for bone, and Masson's Trichrome for fibrous tissue and the phases of development of bone. We will perform immunohistochemistry (IHC) to identify specific cellular phenotypes. For example, we will evaluate pre-hypertrophic chondrocyte phenotype with positive IHC for indian hedge hog, parathyroid hormone receptor 1, and patched 1 receptor. We will identify periostin to track the contribution of the periosteum in bone formation. We will quantify matrix and cell area fractions, cell density (number/area), and average cell size. We will correlate tissue type, cell density and cell size to treatment groups. To evaluate the cytokine milieu in the regenerate tissue, we will use IHC as described for the 1 month assays above. To evaluate the blood vessels and nerves, we will use IHC for von Willebrandt factor (VWF) and CD31, with neural/glial antigen 2 (NG2) to identify pericytes which stabilize vessels.

Statistical Analysis

We will use restricted randomization to allocate experimental groups because bilateral treatments are coupled in the systemic assays of Aim 2 (i.e. cytokine profiling and immune cell characterization). This cannot be avoided without doubling the animal number which is prohibitive.

We have a priori paired the treatments that we expect to have similar effects on these measures so that we can detect cytokine and MSC effects across animals as follows: (i) Group A1 with B1 (Empty controls for Injectable and Implantable device), (ii) Group A2 with B4 (High dose cytokines with no MSCs), (iii) Group A3 with B6 (low dose cytokines with no MSCs), (iv) Group B3 with B5 (High and low dose cytokines with MSCs). Groups A4, B2 and B7 will be randomly paired per animal. These pairings will be randomly assigned to the animals as well as location (left versus right limb).

The limiting factors for sample numbers are the mechanical and bone quantification results. For a statistical power of 0.8 and significance level α=0.05, we calculate a minimum of 6 replicates per treatment are needed to detect a 20% difference in bone formation, based on our previous studies with a coefficient of variation of 0.2. Six samples will also provide detection of mechanical property differences greater than one standard deviation at a power of 0.85. We will use MANOVA in SPSS Statistics (IBM) to detect significant main effects and interactions. We expect that MANOVA for the independent factors (MSCs, hydrogel, cytokine levels, and control materials) will show several insignificant interaction effects. We will thus perform two-way ANOVA to analyze the effects of cytokine level and MSCs with multiple pair-wise comparisons between treatments made using Tukey's HSD post-hoc tests. For ordinal measures (e.g. IHC levels, X-ray scores), we will use a Kruskal-Wallis test to compare across groups and a Mann-Whitney U test to compare within MSC groups at different cytokine levels and within cytokine groups with and without MSCs. In the unlikely case there is no significance detected in the ANOVA, adaptive sampling will be performed to increase the number of samples per group. We will perform a multivariate best fit analysis (a principal component correlation) between the results of Aim 2 and Aim 3 to identify prognostic markers of bone healing, putative factors that if modulated may improve bone healing. We will follow with a Spearman rank order test to identify monotonic correlations between cytokine levels and markers of bone, cartilage and fibrous differentiation, and a Pearson correlation to test if the correlation is linear. The assay time-points are specifically selected to facilitate correlation of transcriptional, cell phenotype, and cytokine activation events that may potentiate and regulate regeneration (early events in healing) to functional outcomes of regeneration (bone volume, mechanical strength, tissue structure). We will apply these prognostic markers in device refinement.

Alternate Approaches

We have already demonstrated manufacturing of the device and the ability to perform all facets of this study. We have considered that several technical and regulatory hurdles must be addressed before achieving our goal of clinical translation to human application. We therefore have proposed this large model animal study as a means to refine our device using data derived from a model animal that exhibits similar bone deposition rates and immune responses to humans than smaller model animals. Further pre-clinical studies will be needed to investigate potential side effects, such as unlikely increased risk of infectious complications due to IL-10. Alternate approaches to some potential hurdles follow.

We will interleave the experimental replicates of each treatment group evenly throughout the 3 years of the study to catch potential complications early and make experimental adjustments. Should our devices fail to show the desired chondrogenic and immunosuppressive effects, we will first investigate the cytokine delivery efficacy at 1 month and adjust the coacervate composition to either increase or decrease release rate. We will modify (i) the amount of heparin used in complex formation and (ii) the molecular properties of PEAD. Less heparin is expected to increase the release of the cytokines. Altering the molecular weight and charge density of PEAD will alter its interaction with heparin, which in turn modifies the release kinetic of the cytokines. These properties can be easily adjusted during polymer synthesis. For example, should the scaffold degrade too slowly to encourage timely vascularization and endochondral ossification, we will increase the release rate of IL-10 so that it is exhausted sooner. IL-10 can down-regulate expression of gelatinase and collagenase (MMP-2, MMP-9) in monocytes and macrophages, which will slow down scaffold degradation and ECM turnover.

Subsequent to modification of coacervate formulation, we will employ alternate device modifications to improve outcomes. For example, should our Implantable Hydrogel Infused Scaffold device with MSCs fail to demonstrate chondrogenesis even at the high TGFρ-3 dose, we will evaluate higher dosing and employ other growth factors such as BMP-2. Should the cells show delay in endochondral ossification, we will decrease the relative composition of P and increase G. G is derived from collagen, and collagen fragments and will be produced as the cells remodel the hydrogel. Collagen fragments promote hypertrophy. They can alter TGF-β signaling and thereby promote hypertrophy, and recent work has found crosstalk between integrins and the TGF-β receptor that may drive this effect. Should the immunomodulatory effects of IL-10 be insufficient to prevent fibrosis, we will employ higher doses and alternate cytokines such as IL-2 and IL-4 which promote a Th2-like response. Should both IL-10 doses show impaired progression of the neocartilage to endochondral ossification or impaired bone remodeling, we will employ a shorter delivery time. Though this is unlikely, IL-10 may limit cytokines such as tumor necrosis factor-α during the third phase of fracture healing and thereby impair endochondral ossification. Based on our preliminary data, we do not expect the hydrogel formulation to have undesirable effect on MSC and progenitor cell chondrogenesis. Should the hydrogel degrade too quickly to help prevent fibrosis or degrade too slowly to sustain cell migration (needed for vascularization, ossification, and remodeling), we will alter crosslink density and mesh size by changing methacryl and thiol density. Should the porous scaffold degrade too slowly, we will use an alternate sponge such as poly(glycerol sebacate).

Regarding technical difficulties with assays, the main limitation arises from the lower availability of antibodies for swine compared to humans and mice. The Luminex panel is available for pigs. Flow-based phenotyping of T cells has been performed in other pig breads. Should an antibody for flow cytometry or immunostaining exhibit poor cross-reactivity with pig cells, we will test alternate antibodies targeting different epitopes of the antigen and targeting antigens from different species.

Military Applications

Military personnel are substantially burdened with traumatic bone injury to the extremities, but no ideal therapy is available to regenerate large bone volumes in compromised sites. Approximately 20% of injured combat personnel suffer extremity bone fracture and loss, of which 80% are open compromised wounds with significant tissue loss post-debridement. Preemptive limb shortening and amputation are used when bone fillers and autografts are contraindicated, e.g. no viable graft source, poor vascularity, excessive acute inflammation, mal-union, and osteomyelitis. The injury sites are sub-optimal for regeneration because the vascular damage and immune responses provoke hypoxia and inflammation which impair bone neogenesis and drive aberrant fibrosis. This leads to delayed reconstruction and healing, multiple surgeries, and non-unions. As an example, it is estimated that more than 1500 total American soldiers had traumatic limb amputations in Afghanistan and Iraq wars. It is estimated that the lifetime costs of care for amputees is greater than $600 billion. Even in the civilian realm, traumatic injury is the $2^{nd}$ leading cause for extremity amputations, of which there are an estimated 700,000 per year, leading to yearly hospital charges of more than $8 billion.

Our bone regeneration technology disclosed herein will promote bone regeneration in compromised wounds without non-union because it addresses the critical limiting factors, namely low osteo/chondro-progenitors, low vascular supply, and a fibrotic immune response. This will minimize the severe morbidity and treatment cost for wounded military personnel, and will improve their quality of life and return to service.

This study's approach to enhance bone regeneration is innovative at least because it focuses on regenerating bone via a cartilaginous intermediate that is more tolerant of the compromised wound environment than bone grafts, and on altering the patient's immune response to improve the sub-optimal tissue environment rather than on supplementing the injury site with anabolic factors alone (e.g. INFUSE and OP-1 implants). Anabolic growth factors has been shown to improve bone healing, such as in fracture models. Coupled with simple carrier materials, some recombinant growth factors have reached widespread clinical use, such as BMP-2 (INFUSE implant) and BMP-7 (OP-1 implant). We believe that targeting the immune/inflammatory response in the injury site is a critical point in acute care where the potential for healing may be improved. The idea of modulating particular cytokines to deter disease progression is not new. However, successful clinical strategies to improve large defect bone healing in compromised wounds have not been identified. Eventually this technology will be applied to benefit patients with less complex injuries, such as the 5-10% of patients that suffer delayed healing and non-union of their fractures.

In an example of a military soldier with a fractured long bone, the disclosed technology can help heal the fracture. Normally, after the injury to the bone a hematoma forms, macrophages and inflammatory leukocytes infiltrate the area, and the inflammatory process is initiated. Application of the herein disclosed technology to such a fractured bone site can help mitigate hypoxia and non-union of the fracture, by local immunomodulation via the cytokines and MSCs, and by regenerating bone through a cartilaginous intermediate.

The hydrogel acts as a carrier for the cytokines and MSCs and controls the MSC differentiation. The hydrogel also preserves and promotes cytokine activity via the hydrated environment and direct binding of the cytokines. The hydrogel also promotes MSC chondrogenesis and endochondral ossification through hydrophilic nature, support of spherical cell shape, and enhancement of the chondrocyte phenotype. Nanoparticles in the material can include coacervates (aggregates of colloidal droplets) of heparin and a synthetic polymer, they can bind the cytokines via charge interactions, and can stabilize and protect the cytokines and prolong their release. The scaffold can be made from the same polymers as the hydrogel and can provide structural integrity to the implantable device in large defects.

MSCs and immunomodulatory cytokines make the wound environment more conducive to regeneration while the hydrogel creates an anti-fibrotic barrier. The hydrogel and a chondrogenic cytokine drive cartilage formation by the MSCs. Neocartilage is similar to the cartilage callus formed during limb fracture healing and undergoes endochondral ossification to produce bone in wounds with compromised vascularity.

The disclosed materials can be applied using an injectable device (e.g., percutaneous injection), such as be first responders. This can help stabilize bone fragments in comminuted fractures, prevent fibrous tissue ingrowth, and rapidly initiate regeneration. The disclosed materials can also be applied via an implantable device (e.g., used in an operating theater). An implantable device can help promote bone formation and minimize non-union when conventional autografts and bone filters are contraindicated. In any application, the this technology can mitigate the inflammatory response driving fibrosis and inadequate bone healing. The technology also can provide reconstructive options when autologous bone is not available. The technology has broad applicability across the entire reconstructive and orthopedic surgery fields.

Other Experimental Results

The following describes experiments and results related to the herein disclosed technology.

Various immunomodulatory factors were considered, including cytokines and chemical immunosuppressants. Cytokines considered include interleukins (e.g., IL-4, IL-10, IL-13), lymphokines (e.g., granulocyte-macrophage colony-stimulating factor (GM-CSF, a.k.a. CSF2), a recombinant Sargamostim sold as Leukine), and chemokines (e.g., CCL17, CCL22, SDF-1 (a.k.a. CXCL12). Chemical immunosuppressants considered include Tacrolimus and Rapamycin.

Also considered were various injectable hydrogel cross-linking mechanisms without radiant energy, including chemical bonding via persulfate salts (e.g., ammonium persulphate, potassium persulfate, sodium persulfate), chemical bonding via thiol-ene/thiol-Michael addition, and physical crosslinking.

Here, PGH refers to composite hydrogel comprising poly(ethylene glycol), gelatin, and heparin. GEL refers to hydrogel comprising gelatin. AGN refers to aggrecan. GAG refers to glycosaminoglycans. TGFB-3 refers to transforming growth factor beta-3. ITS refers to insulin, transferrin, selenium. Col10 refers to collagen type 10.

FIG. 10 illustrates how an exemplary PGH hydrogel inhibited osteogenesis compared to GEL, shown by Vonkossa and Alizarin red stainings. Black dots here are phosphate, indicated by the red arrows. and red dots here are calcium. Indicated by the blue arrows. We confirmed it at the molecular level by detecting expression of Col10, a marker for hypertrophy, and we also looked at BSP, bonesialoprotein, which is a marker for osteoblast. Cells in PGH expressed 10 times less Col10 and 60× less BSP than cells in GEL. $30 \times 10^{\wedge}6$/ml bone marrow derived human stem cell embedded in the hydrogels and implanted in subcutaneous pockets in mice.

Figure 11A:
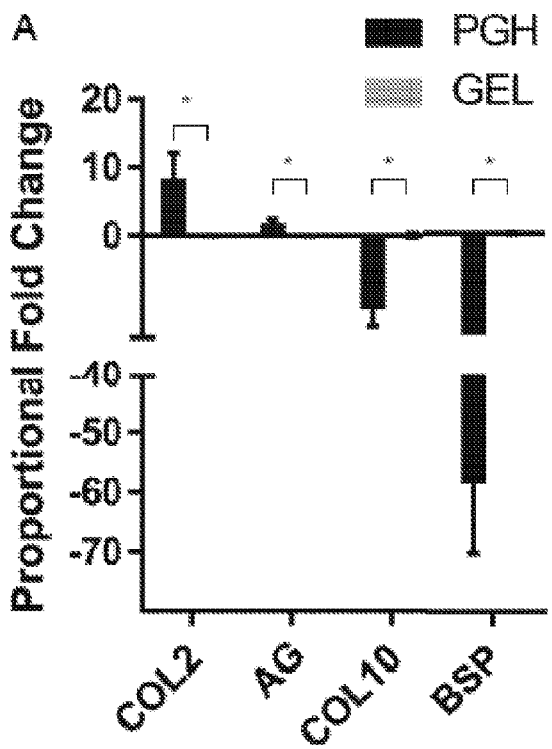
FIGS. 11A-11C illustrate how the PGH hydrogel enhanced chondrogenesis by human MSCs compare to the GEL hydrogel.
Figure 11B:
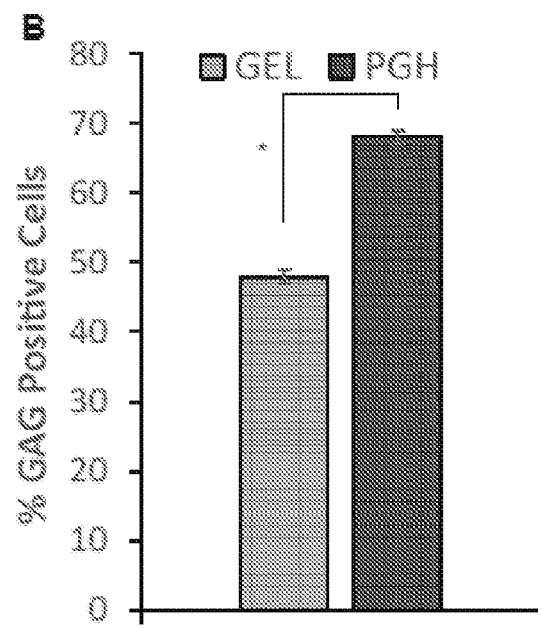
Figure 11C:
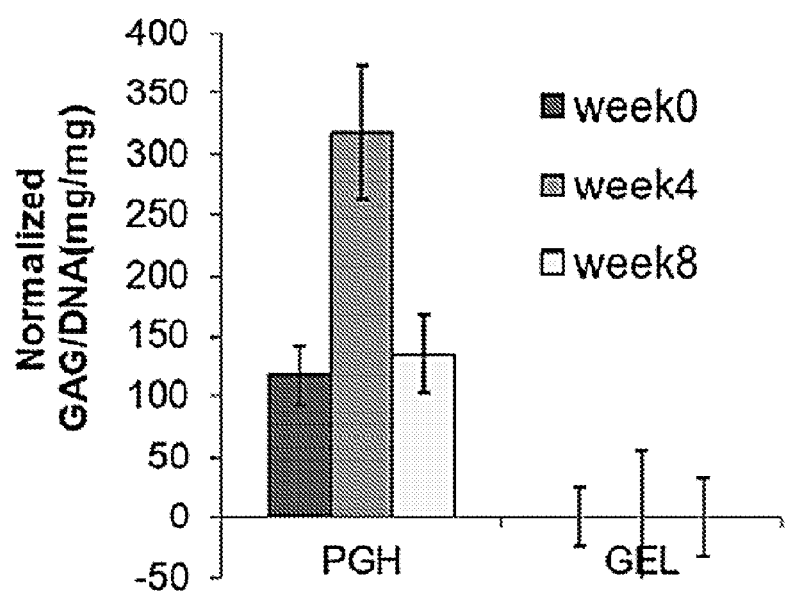

FIGS. 11A-11C illustrate how the PGH hydrogel enhanced chondrogenesis by human MSCs compared to the GEL hydrogel. PGH was better at supporting chondrogenesis. The biochemical assay confirmed that the cells in PGH made more glycosaminoglycan than cells in GEL. ($30 \times 10^{\wedge}6$/ml bone marrow derived human stem cell embedded in the hydrogels and implanted in subcutaneous pockets in mice.)

FIGS. 12A-12D compare chondrogenesis vs. osteogenic culture in vitro. The PGH shows more extensive chondrogenesis and inhibition of osteogenesis. Stem cells in hydrogels were exposed to chondrogenic (top row) versus osteogenic culture conditions (bottom row). Beta-glycerophosphate concentration was increased to 20 mM to observe mineralization in the PGH gel (beyond levels used in osteogenic assays in vitro). Chondrogenic (serum free): α-MEM+1×ITS, 1×P/S, 10 ng/ml TGFB-3, 50 uM ascorbate and dexamethasone. Osteogenic (serum containing): α-MEM+10% (w/v) fetal bovine serum, 1× penicillin/streptomycin, 20 mM P-glycerophosphate (mineral source), 50 uM ascorbate and dexamethasone. $30 \times 10^{\wedge}6$/ml bone marrow derived human stem cell embedded in the hydrogels and cultured over 4 weeks in vitro.

Figure 13:
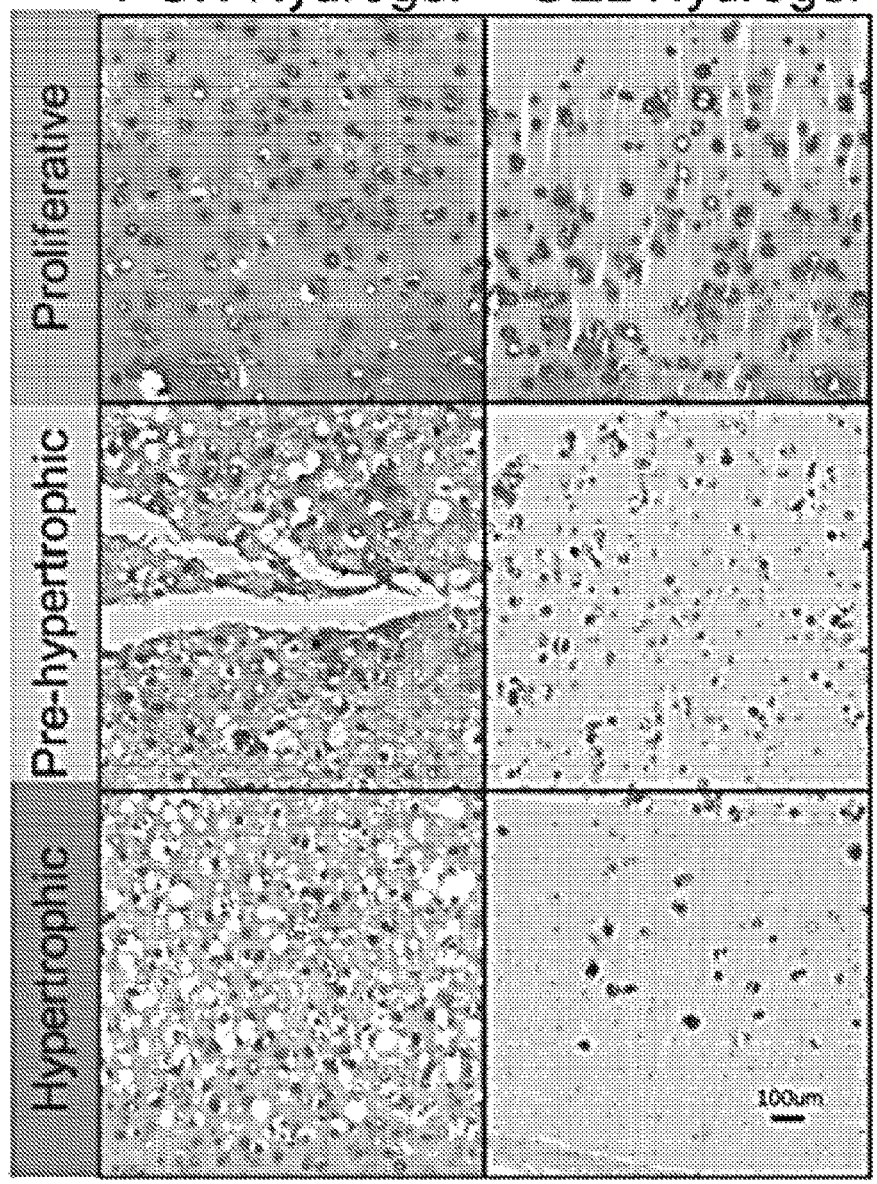
FIGS. 13 and 14 illustrate how the PGH hydrogels promote cartilage matrix accumulation and maintenance of chondrocytes in a cartilage matrix synthetic state.
Figure 14:
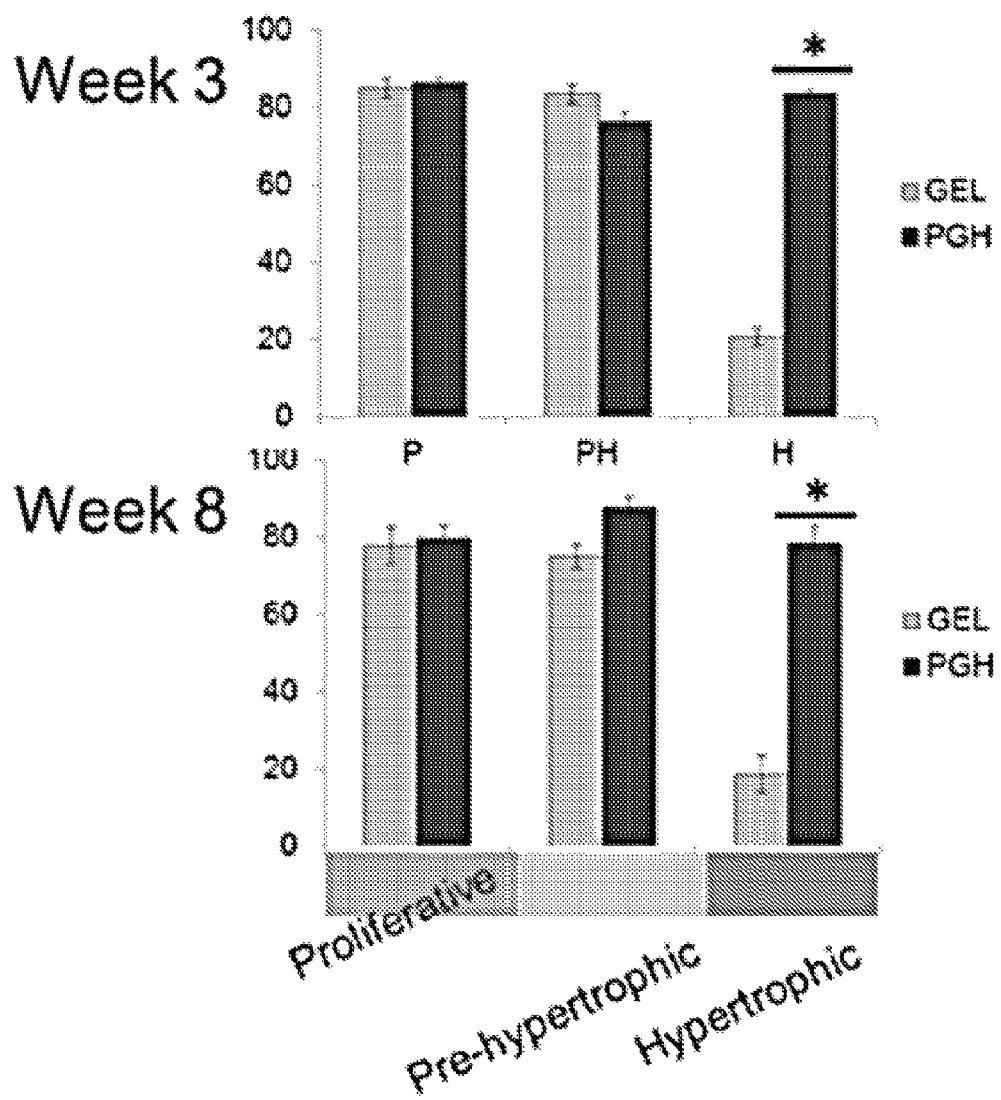

FIGS. 13 and 14 illustrate how PGH hydrogels promote cartilage matrix accumulation and maintenance of chondrocytes in a synthetic state. The chondrocytes secret more cartilage matrix in PGH than in Gelatin. The pink stain is safranin O (glycosaminoglycans, GAGs). PGH had much stronger staining than gelatin. Quantitative image analysis showed that PGH hydrogel contained significantly higher percentage of GAG secreting hypertrophic chondrocytes. Indicated in the red box.

Figure 15:
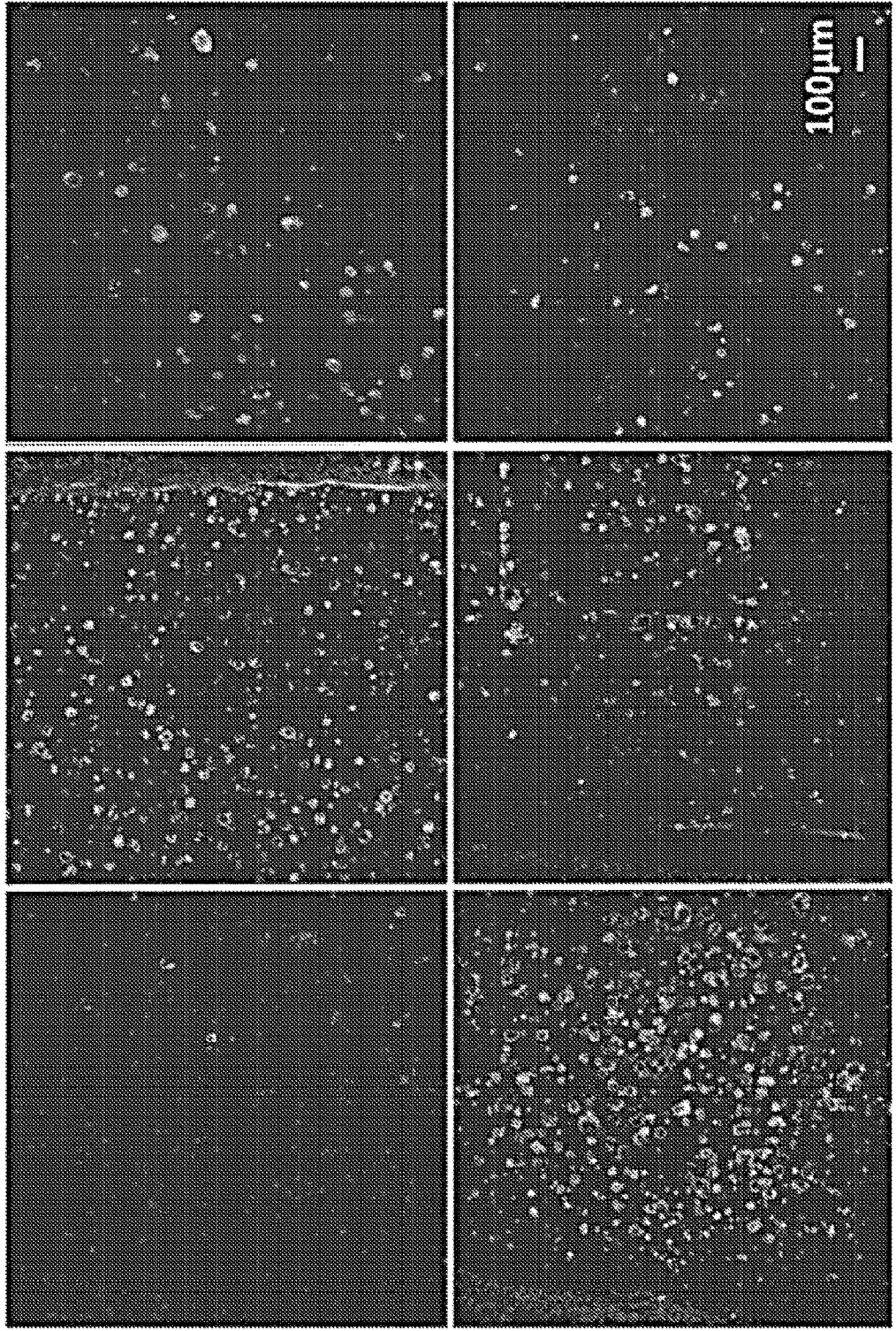
FIG. 15 illustrates how the PHG hydrogel delays hypertrophy of pre-hypertrophic chondrocytes by 2 weeks compared to GEL hydrogels.

FIG. 15 illustrates how the PHG hydrogel delays hypertrophy of pre-hypertrophic chondrocytes by 2 weeks compared to GEL hydrogels. The PGH hydrogel delayed chondrocyte hypertrophy compared to GEL at week 1 (first column). PGH had very few Col10 positive cells. By week 3, PGH caught up. At week 8, there was almost no difference between PGH and gelatin in terms of Col10 secretion.

Figure 16:
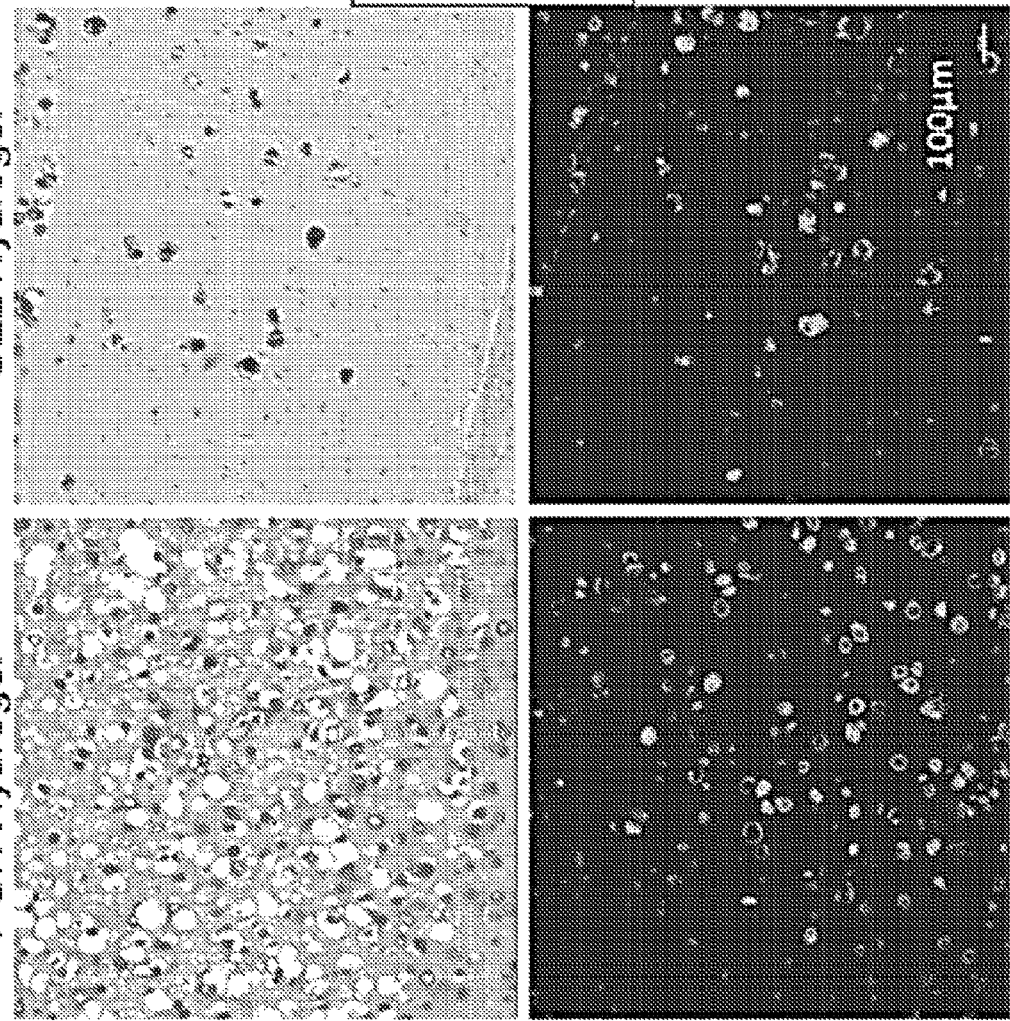
FIG. 16 illustrates how the PGH hydrogel promoted GAG production (red Safranin O stain) by hypertrophic chondrocytes (green stain for Col 10a1) at all time-points.

FIG. 16 illustrates how the PGH hydrogel promoted GAG production by hypertrophic chondrocytes at all time-points. Hypertrophic chondrocytes secrete Col10 in PGH (which is a marker for hypertrophic chondrocytes), but they produce glycosaminoglycan at high amounts, which is not their normal phenotype program. Thus, PGH was able to induce hypertrophic chondrocytes to continue secreting GAG.

FIGS. 17A-17H illustrates the efficacy of the PGH hydrogel containing TGFβ-1 at treating bone defects in comparison to "INFUSE" and control untreated defects. FIG. 17B shows that PGH containing TGFβ-1 lead to significant woven bone formation in 3 cm segmental fibular defects in minipigs after one month growth as evidenced by lack of lamellar structure and high osteocyte content compared to the cortical bone. Woven bone contained high osteocyte density (OCs) and active osteoid surfaces lined with osteoblasts (OBs). FIG. 17A shows that untreated defects produce woven bone near the osteotomy site but no bone in the defect proper. FIG. 17C shows that INFUSE also yielded woven bone regeneration in the defect. FIG. 17D shows that the gelatin sponge with TGFβ-1 also produced significant woven bone in the defect proper. FIG. 17F shows that PGH scaffolds also yielded some cartilage (G). FIG. 17G shows that INFUSE yielded more cartilage evident at one month than treatments with TGFβ-1.

FIGS. 18A-18D illustrate more recently obtained data regarding the efficacy of PGH hydrogel at treating bone defects. Our three groups were non-treated control (FIG. 18B), the PGH hydrogel (FIG. 18C), and the standard of care that is a collagen sponge with BMP-2, a.k.a. "INFUSE", (FIG. 18D). The graph in FIG. 18A shows the % of bone found in the defect with respect to empty control. FIGS. 18B-18D show representative histological images of each group in which the bone was visually quantified. The data and pictures clearly show that our technology elicits bone formation when compared to empty control, and is at least equivalent to INFUSE without causing ectopic bone formation.

Figure 19:
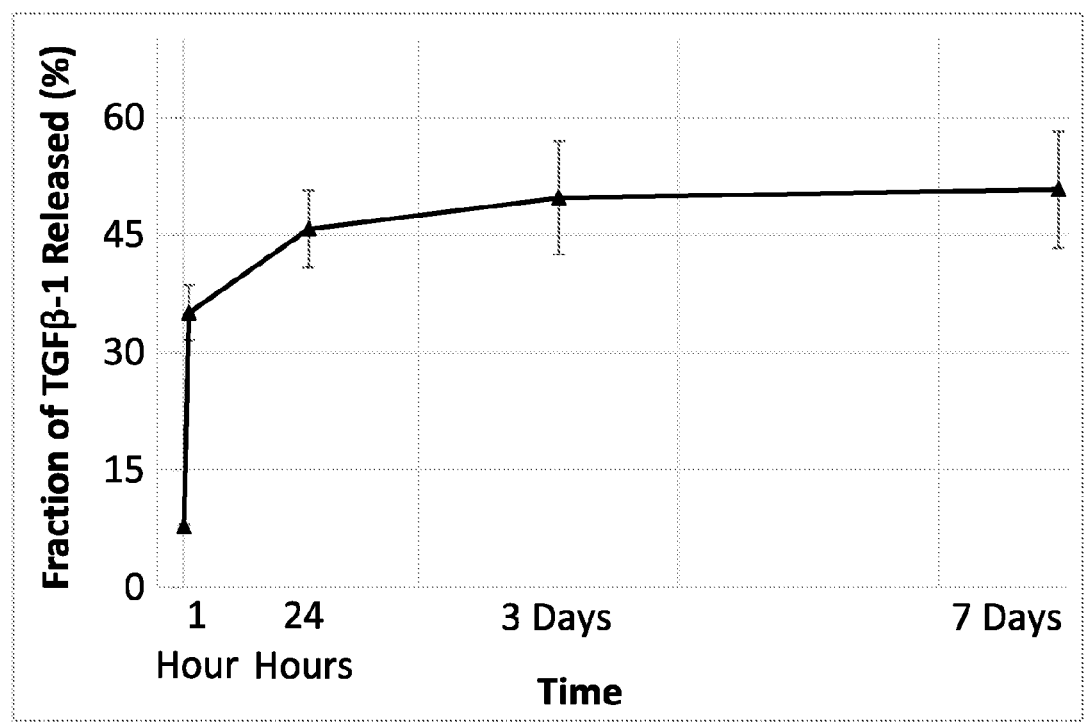
FIG. 19 shows the temporal release profile of TGFβ-1 from the PGH hydrogel in vitro without the use of nanoparticles. The PGH hydrogel serves as a carrier for the TGFβ-1. After an initial burst release over one day, approximately half of the TGFβ-1 remains bound to the PGH and is released as the scaffold degrades.

FIG. 19 depicts the temporal release profile of TGFβ-1 from the PGH hydrogel in vitro without the use of nanoparticles.

FIGS. 20A and 20B show that the PGH hydrogel with TGFβ-1 undergoes resorption over two weeks in vivo through several stages.

Figure 21A:
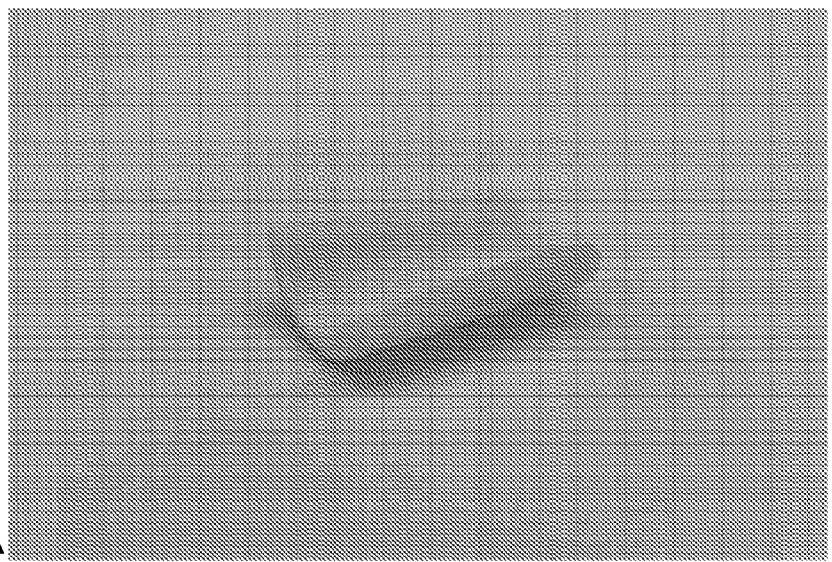
FIGS. 21A-21C show the assembly of an exemplary embodiment comprising a gelatin sponge as a wrap around a hydrogel interior that contains the growth factors and/or cells.
Figure 21B:
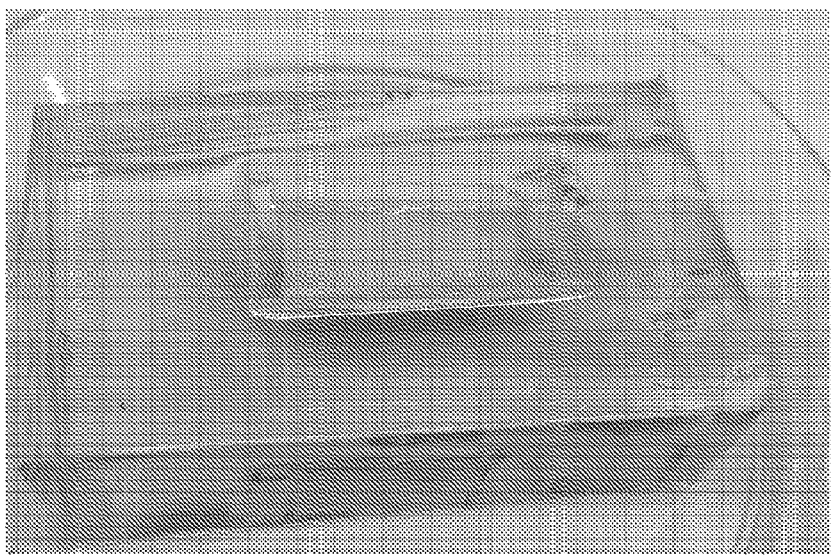
Figure 21C:
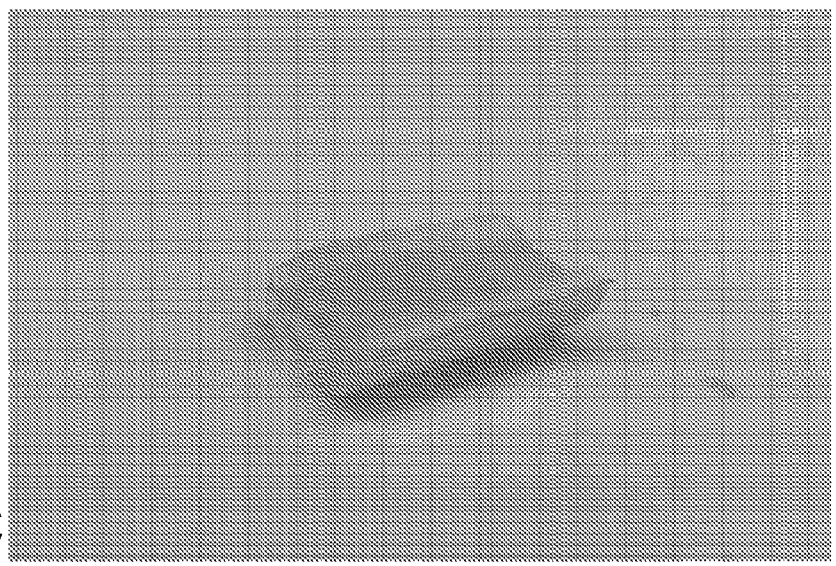

FIGS. 21A-21C show the assembly of a preferred embodiment comprising a gelatin sponge as a wrap around the hydrogel interior that contains the growth factors and/or cells. FIG. 21A shows the sponge scaffold. FIG. 21B shows the sponge placed in a mold and filled with the liquid precursor of the PGH hydrogel containing growth factors. The mold serves to contain the liquid hydrogel precursor prior to gelation and hydrogel formation. FIG. 21C shows the implant containing the PGH hydrogel with cytokines.

Figure 22:
FIG. 22 shows a delivery device comprising a syringe for the injectable PGH hydrogel containing growth factors.

FIG. 22 shows a delivery device including two syringes for the injectable PGH hydrogel containing growth factors. The contents of the two syringes can be combined together, mixing a powder with a liquid to create the biomaterial. For example, the two syringes can be attached so the outlets of both are joined and the mixture of the two is ejected from a common outlet, such as into a wound. Alternatively, the two syringes can be used separately to inject the contents of each into the wound or another container/delivery device where the mixing occurs.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Characteristics and features described in conjunction with a particular aspect, embodiment, or example of the disclosed technology are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A", "B,", "C", "A and B", "A and C", "B and C", or "A, B, and C." As used herein, the term "coupled" generally means physically, chemically, fluidly, electrically, or magnetically coupled or linked and does not exclude the presence of intermediate elements between the coupled items absent specific contrary language.

In view of the many possible embodiments to which the principles of the disclosed technology may be applied, it should be recognized that the illustrated embodiments are only examples and should not be taken as limiting the scope of the disclosure. Rather, the scope of the invention(s) disclosed herein is defined by the following claims. We therefore claim as our invention all that comes within the scope and spirit of these claims.

The invention claimed is:

1. A biomaterial comprising:
a hydrogel comprising the crosslinked polymers PEG, gelatin, and a glycosaminoglycan with sulfated moiety, wherein a ratio of the glycosaminoglycan with sulfated moiety to the PEG by mass is 1/1 or greater; and
chondrogenic, osteogenic, and immunomodulatory cytokines, wherein the cytokines comprise TGF-β1;
wherein the biomaterial is acellular, the biomaterial comprises about 1 mg/ml of the TGF-β1, and the biomaterial is capable of potentiating bone regeneration in a compromised wound while reducing inflammatory response in a large animal.

2. The biomaterial of claim 1, wherein a ratio of the gelatin to the PEG by mass is 1/1 or greater.

3. The biomaterial of claim 1, wherein the hydrogel comprises from 7.5% to 8.5% mass of PEG, gelatin, and a glycosaminoglycan with sulfated moiety to the volume of hydrogel.

4. The biomaterial of claim 1, wherein the glycosaminoglycan with sulfated moiety comprises heparin.

5. The biomaterial of claim 1, wherein the glycosaminoglycan with sulfated moiety comprises chondroitin sulfate.

6. The biomaterial of claim 1, further comprising a crosslinking initiator.

7. The biomaterial of claim 1, further comprising a porous scaffold providing mechanical support for other components of the biomaterial.

8. A method comprising injecting or implanting the biomaterial of claim 1 into a compromised wound.

9. The method of claim 8, wherein the injected or implanted biomaterial suppresses inflammatory response and potentiates bone regeneration at the compromised wound.

10. The biomaterial of claim 1, wherein the large animal comprises a human or a swine.

11. The biomaterial of claim 1, wherein:
the glycosaminoglycan with sulfated moiety comprises heparin; and
the hydrogel comprises the PEG, the gelatin, and the heparin in about a 3:4:3 proportion by mass.

* * * * *